(12) United States Patent
Tsuji et al.

(10) Patent No.: US 10,910,838 B1
(45) Date of Patent: Feb. 2, 2021

(54) ENERGY MANAGEMENT DEVICE, HYDROGEN UTILIZATION SYSTEM, NON-TRANSITORY COMPUTER READABLE MEDIUM, AND ENERGY MANAGEMENT METHOD

(71) Applicant: HONDA MOTOR CO.,LTD., Tokyo (JP)

(72) Inventors: Yutaka Tsuji, Tokyo (JP); Yuji Yamamoto, Tokyo (JP); Jun Ishikawa, Saitama (JP); Kazuyoshi Miyajima, Saitama (JP); Takayuki Yamada, Saitama (JP); Yuiko Koga, Tokyo (JP); Shigeaki Esaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/980,440

(22) PCT Filed: Mar. 30, 2018

(86) PCT No.: PCT/JP2018/013982
§ 371 (c)(1),
(2) Date: Sep. 14, 2020

(87) PCT Pub. No.: WO2019/187153
PCT Pub. Date: Oct. 3, 2019

(51) Int. Cl.
*H02J 3/38* (2006.01)
*H02J 13/00* (2006.01)
*G05B 19/042* (2006.01)

(52) U.S. Cl.
CPC ............ *H02J 3/381* (2013.01); *G05B 19/042* (2013.01); *H02J 13/00002* (2020.01);
(Continued)

(58) Field of Classification Search
CPC .. H02J 3/381; H02J 13/00002; H02J 2300/20; H02J 2203/10; G05B 19/042; G05B 2219/2639
See application file for complete search history.

(56) References Cited

U.S. PATENT DOCUMENTS 8,435,684 B2 * 5/2013 Kani ........................ C01B 3/48
429/410
9,624,913 B2 * 4/2017 Friesth ..................... F01K 13/00
(Continued)

FOREIGN PATENT DOCUMENTS

JP 2003119586 A 4/2003
JP 2003257443 A 9/2003
(Continued)

OTHER PUBLICATIONS (ISA/237) Written Opinion of the International Search Authority for International Patent Application No. PCT/JP2018/013982, mailed by the Japan Patent Office dated Jun. 19, 2018.
(Continued)

*Primary Examiner* — Ramesh B Patel

(57) ABSTRACT

An energy management device comprises a first supply/demand information acquisition unit, a second supply/demand information acquisition unit, and a supply/demand management unit configured to determine, based on the first supply/demand information and the second supply/demand information, at least one of (i) an upper limit value of a power amount that the hydrogen generation system can receive from a power grid during a certain period, (ii) a target value of an amount of hydrogen that the hydrogen generation system generates during the certain period, (iii) an upper limit value of a power amount that each of the one or plurality of tri-generation systems can transmit to the power grid during the certain period, and (iv) a target value
(Continued)

of a power amount that each of the one or plurality of tri-generation systems generates during the certain period.

11 Claims, 9 Drawing Sheets

(52) U.S. Cl.
CPC ... *G05B 2219/2639* (2013.01); *H02J 2203/10* (2020.01); *H02J 2300/20* (2020.01)

(56) References Cited

U.S. PATENT DOCUMENTS

| | | | |
|---|---|---|---|
| 2005/0112425 A1* | 5/2005 | Hsu | C01B 13/0251 |
| | | | 429/410 |
| 2006/0118575 A1* | 6/2006 | Boyd | F17C 5/007 |
| | | | 222/3 |
| 2006/0177372 A1* | 8/2006 | Doshi | C01B 3/384 |
| | | | 423/652 |
| 2008/0118800 A1 | 5/2008 | Devriendt | |
| 2010/0203403 A1* | 8/2010 | Kani | B01D 53/04 |
| | | | 429/423 |
| 2014/0174080 A1* | 6/2014 | Friesth | F01K 3/00 |
| | | | 60/641.1 |
| 2019/0280485 A1* | 9/2019 | Kishi | C10L 1/02 |

FOREIGN PATENT DOCUMENTS

| | | |
|---|---|---|
| JP | 2007501178 A | 1/2007 |
| JP | 2007523443 A | 8/2007 |
| JP | 2007265732 A | 10/2007 |
| JP | 4295817 B2 | 7/2009 |
| JP | 4328069 B2 | 9/2009 |
| JP | 2010508633 A | 3/2010 |
| JP | 2010189233 A | 9/2010 |
| JP | 4775790 B2 | 9/2011 |
| JP | 2016000995 A | 1/2016 |
| JP | 2016503477 A | 2/2016 |
| JP | 6030158 B2 | 11/2016 |
| JP | 2017076611 A | 4/2017 |

OTHER PUBLICATIONS

Decision to Grant a Patent issued for counterpart Japanese Application No. 2020-508917, issued by the Japan Patent Office dated Aug. 11, 2020 (dated Aug. 3, 2020).

* cited by examiner

TOTAL RESULT OF AGRICULTURAL FACILITY 122

| SUPPLIER/ DEMANDER ID | PERIOD | POWER PURCHASE AMOUNT [kWh] | POWER SELLING AMOUNT [kWh] |
|---|---|---|---|
| U_122 | 2018/3 | 3000 | 1000 |

SETTLED RESULT OF AGRICULTURAL FACILITY 122

| SUPPLIER/ DEMANDER ID | PERIOD | POWER PURCHASE AMOUNT [kWh] | POWER SELLING AMOUNT [kWh] |
|---|---|---|---|
| U_122 | 2018/3 | 3000 | 0 |

TOTAL RESULT OF AGRICULTURAL FACILITY 124

| SUPPLIER/ DEMANDER ID | PERIOD | POWER PURCHASE AMOUNT [kWh] | POWER SELLING AMOUNT [kWh] |
|---|---|---|---|
| U_124 | 2018/3 | 30000 | 30000 |

SETTLED RESULT OF AGRICULTURAL FACILITY 124

| SUPPLIER/ DEMANDER ID | PERIOD | POWER PURCHASE AMOUNT [kWh] | POWER SELLING AMOUNT [kWh] |
|---|---|---|---|
| U_124 | 2018/3 | 29000 | 30000 |

FIG. 7

| 900 | 912 | 914 | 916 | 918 | 920 | 922 | 924 |
|---|---|---|---|---|---|---|---|
| | VEHICLE ID | LOCATION | USAGE | TYPE | REMAINING ENERGY AMOUNT | STATUS | AVAILABLE TIME |
| | ·· | ·· | ·· | ·· | ·· | ·· | ·· |
| | V_001 | * | FOR LENDING | FCV | * | AVAILABLE | : |
| | V_002 | * | FOR POWER SUPPLY | EV | — | IN USE | :** |
| | V_003 | * | FOR CARRYING HYDROGEN | FCV | * | UNDER MAINTENANCE | : |
| | ·· | ·· | ·· | ·· | ·· | ·· | ·· |

*FIG. 9*

ENERGY MANAGEMENT DEVICE, HYDROGEN UTILIZATION SYSTEM, NON-TRANSITORY COMPUTER READABLE MEDIUM, AND ENERGY MANAGEMENT METHOD

CROSS-REFERENCE TO RELATED APPLICATIONS

This application is a National Stage Entry of International Application No. PCT/JP2018/013982, filed on Mar. 30, 2018, the contents of which are hereby incorporated by reference in its entirety.

BACKGROUND

1. Technical Field

The present invention relates to an energy management device, a hydrogen utilization system, a non-transitory computer readable medium, and an energy management method.

2. Related Art

A technique of generating hydrogen by electric power generated using renewable energy is known (for example, see Patent document 1 to 5). Patent document 6 discloses setting hydrogen supply pipes in town to realize a CEMS. Patent document 7 discloses that a boiler, a microturbine or the like may be combined with a system capable of producing hydrogen and co-producing electric power.

[Related Art Documents]
[Patent Documents]

Patent document 1: Japanese Patent No. 6030158
Patent document 2: Japanese Unexamined Patent Application Publication No. 2017-76611
Patent document 3: Japanese Patent No. 4775790
Patent document 4: Japanese Unexamined Patent Application Publication No. 2003-257443
Patent document 5: Japanese Patent No. 4328069
Patent document 6: Japanese Unexamined Patent Application Publication No. 2007-265732
Patent document 7: Japanese Translation of PCT International Patent Application Publication No. 2007-523443

[Technical Problem]

In recent years, it has been considered to encourage utilization of hydrogen as an energy source. In order to encourage utilization of hydrogen, it is desired to lighten economical burdens on individual users and reduce investment cost for an infrastructure.

GENERAL DISCLOSURE

In a first aspect of the present invention, an energy management device is provided. The energy management device includes, for example, a first supply/demand information acquisition unit configured to acquire first supply/demand information indicating power supply/demand and hydrogen supply/demand in a hydrogen generation system configured to generate hydrogen by utilizing electric power. The energy management device includes, for example, a second supply/demand information acquisition unit configured to acquire second supply/demand information indicating power supply/demand and hydrogen supply/demand in each of one or plurality of tri-generation systems. The energy management device includes, for example, a supply/demand management unit configured to determine, based on the first supply/demand information and the second supply/demand information, at least one of (i) an upper limit value of a power amount that the hydrogen generation system can receive from a power grid during a certain period, (ii) a target value of an amount of hydrogen that the hydrogen generation system generates during the certain period, (iii) an upper limit value of a power amount that each of the one or plurality of tri-generation systems can transmit to the power grid during the certain period, and (iv) a target value of a power amount that each of the one or plurality of tri-generation systems generates during the certain period.

In the energy management device, each of the one or plurality of tri-generation systems includes a carbon dioxide generation unit configured to generate carbon dioxide, for example. In the energy management device, each of the one or plurality of tri-generation systems includes a power generation unit configured to generate electric power by utilizing hydrogen, for example. In the energy management device, each of the one or plurality of tri-generation systems includes a heat generation unit configured to generate heat, for example.

The energy management device may include a first request acquisition unit configured to acquire a first request for requesting permission for power transmission from a first tri-generation system of the one or plurality of tri-generation systems to the power grid. The energy management device may include a first determination unit configured to determine whether to permit or prohibit the power transmission based on the first supply/demand information when the first request acquisition unit received the first request. In the energy management device, the first determination unit may determine to prohibit the power transmission when an excessiveness of hydrogen supply in the hydrogen generation system indicated by the first supply/demand information satisfies a predetermined first condition.

The energy management device may include a power transmission and reception amount management unit configured to manage information indicating at least one of a power transmission amount and a power reception amount between (i) each of the one or plurality of tri-generation systems and the hydrogen generation system and (ii) the power grid. The energy management device may include a power transmission and reception amount adjustment unit configured to, when the first determination unit determined to permit the power transmission, (i) subtract a power transmission amount from the first tri-generation system to the power grid pertaining to the permission, from a power reception amount of the hydrogen generation system from the power grid or (ii) add a power transmission amount from the first tri-generation system to the power grid pertaining to the permission, to a power transmission amount from the hydrogen generation system to the power grid.

The energy management device may include a movable object management unit configured to manage information indicating a state of one or plurality of movable objects. The energy management device may include a second request acquisition unit configured to acquire a second request for requesting to move at least one of the one or plurality of movable objects to a second tri-generation system of the one or plurality of tri-generation systems. The energy management device may include a second determination unit configured to determine, when the second request acquisition unit received the second request, a movable object to be moved to the second tri-generation system among the one or plurality of movable objects based on (i) the second supply/demand information and (ii) the information indicating a state of the one or plurality of movable objects.

In the energy management device, each of the one or plurality of movable objects can be equipped with at least one of a hydrogen storage container, a fuel cell and a storage battery, for example. In the energy management device, the information indicating a state of the one or plurality of movable objects may include information indicating a remaining amount of hydrogen or a remaining battery level of each movable object. In the energy management device, the second determination unit may determine, when an excessiveness of hydrogen supply in the second tri-generation system indicated by the second supply/demand information satisfies a predetermined second condition, a movable object whose remaining amount of hydrogen satisfies a predetermined third condition or a movable object whose remaining battery level satisfies a predetermined fourth condition as a movable object to be moved to the second tri-generation system.

In a second aspect of the present invention, a hydrogen utilization system is provided. The hydrogen utilization system includes an energy management device, for example. The hydrogen utilization system may include the energy management device according to the first aspect. The hydrogen utilization system includes a hydrogen generation system, for example. The hydrogen utilization system includes one or plurality of tri-generation systems, for example.

In a third aspect of the present invention, a program is provided. A non-transitory computer-readable medium for storing the program may also be provided. The program may be a program for causing a computer to function as the energy management device according to the first aspect. The program may be a program for causing the computer to execute a variety of information processing sequences in the energy management device.

In a fourth aspect of the present invention, an energy management method is provided. The energy management method includes, for example, acquiring, by a computer, first supply/demand information indicating power supply/demand and hydrogen supply/demand in a hydrogen generation system configured to generate hydrogen by utilizing electric power. The energy management method includes, for example, acquiring, by the computer, second supply/demand information indicating power supply/demand and hydrogen supply/demand in each of one or plurality of tri-generation systems. The energy management method includes, for example, managing supply/demand by the computer, by determining, based on the first supply/demand information and the second supply/demand information, at least one of (i) an upper limit value of a power amount that the hydrogen generation system can receive from a power grid during a certain period, (ii) a target value of amount of hydrogen that the hydrogen generation system generates during the certain period, (iii) an upper limit value of a power amount that each of the one or plurality of tri-generation systems can transmit to the power grid during the certain period, and (iv) a target value of a power amount that each of the one or plurality of tri-generation systems generates during the certain period.

In the energy management method, each of the one or plurality of tri-generation systems includes a carbon dioxide generation unit configured to generate carbon dioxide, for example. In the energy management method, each of the one or plurality of tri-generation systems includes a power generation unit configured to generate electric power by utilizing hydrogen, for example. In the energy management method, each of the one or plurality of tri-generation systems includes a heat generation unit configured to generate heat, for example.

The summary clause does not necessarily describe all necessary features of the embodiments of the present invention. The present invention may also be a sub-combination of the features described above.

BRIEF DESCRIPTION OF THE DRAWINGS

FIG. 7 schematically shows one example of information processing in a settlement unit 632.

FIG. 9 schematically shows one example of a data table 900.

DESCRIPTION OF EXEMPLARY EMBODIMENTS

The following describes the present invention through embodiments of the invention, but the below embodiments do not limit the invention according to the claims. In addition, not all the combination of features described in the embodiments is necessarily required in solutions of the invention. Identical or similar portions in figures are given identical reference numbers, and the same explanation is omitted in some

[Outline of energy management system 100]

Figure 1:
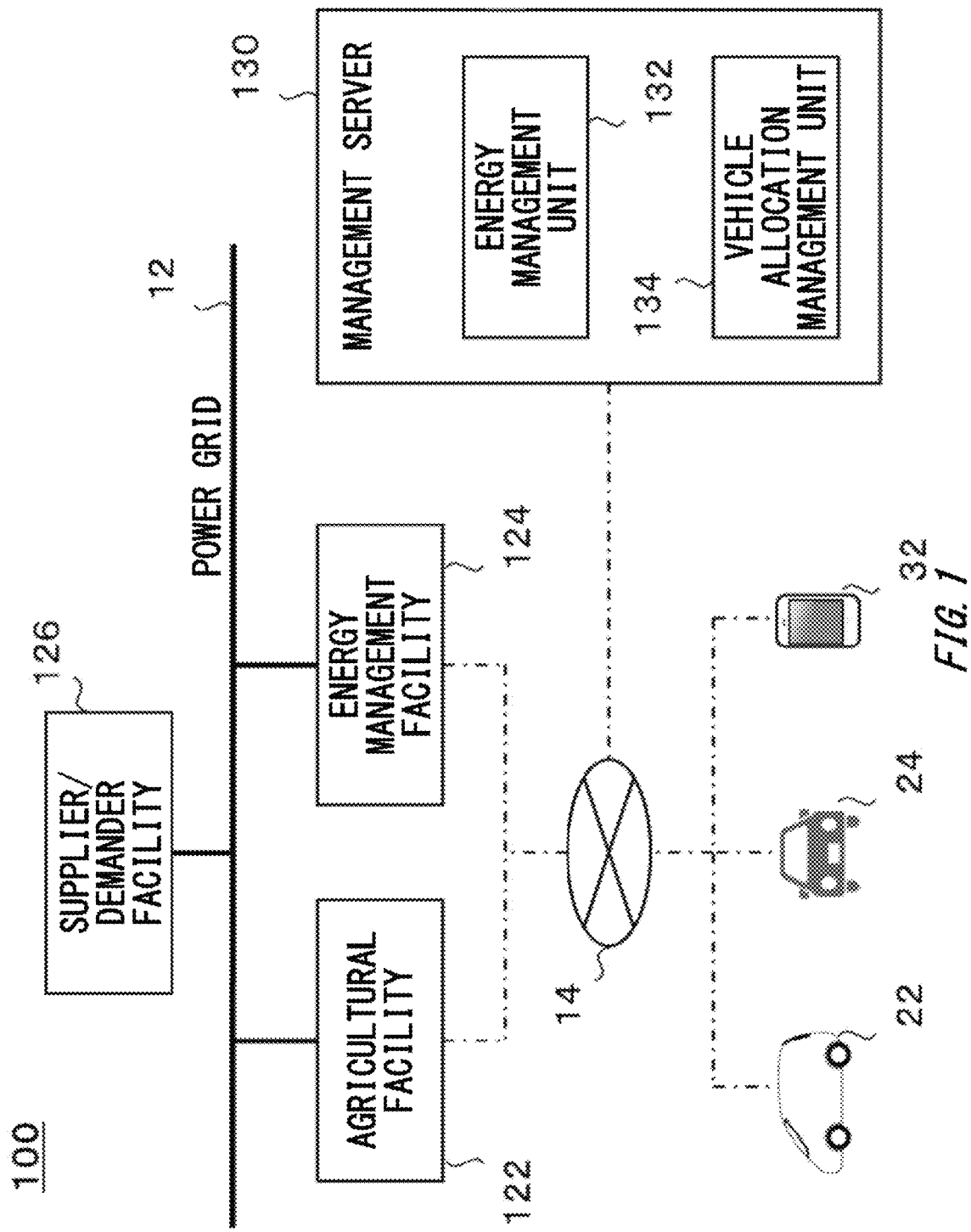
FIG. 1 schematically shows one example of a system configuration of an energy management system 100.

FIG. 1 schematically shows one example of a system configuration of an energy management system 100. In the present embodiment, the energy management system 100 includes, for example, one or plurality of (which may be referred to as one or more) agricultural facilities 122, one or more energy management facilities 124, one or more supplier/demander facilities 126, and a management server 130. In the present embodiment, a management server 130 includes, for example, an energy management unit 132 and a vehicle allocation management unit 134. The energy management system 100 may be one example of an energy management device and a hydrogen utilization system. The agricultural facility 122 may be one example of an energy generator. The energy management facility 124 may be one example of the energy generator. The supplier/demander facility 126 may be one example of the energy generator. The management server 130 may be one example of an energy management device. The energy management unit 132 may be one example of the energy management device.

In the present embodiment, each of the agricultural facility 122, the energy management facility 124, and the supplier/demander facility 126 is electrically connected to a power grid 12. Each of the agricultural facility 122, the energy management facility 124, and the supplier/demander facility 126 can transmit and receive electric power to and from the power grid 12. In the present embodiment, each unit of the energy management system 100 can transmit and receive information to and from each other via a communication network 14.

In the present embodiment, the power grid 12 is electrically connected to a commercial power supply (not shown).

The power grid 12 may be a power system provided by a power business operator or a power transmission business operator. The power grid 12 may include power systems of a plurality of power business operators or a plurality of power transmission business operators. The power system may be a system in which power generation, power transformation, power transmission, and power distribution are integrated.

As used herein, "element A and element B are electrically connected" is not limited to a case in which the element A and the element B are physically connected. For example, input windings and output windings in a transformer are not physically connected, but they are electrically connected. Moreover, a component for electrically connecting the element A and the element B may be interposed between the element A and the element B. Examples of the component include a conductor, a circuit breaker or a switch, a transformer, or the like.

In the present embodiment, the communication network 14 may be a wired communication transmission path, a wireless communication transmission path, or a combination of a wireless communication transmission path and a wired communication transmission path. The communication network 14 may include a wireless packet communication network, the Internet, a P2P network, a dedicated line, a VPN, an electrical power line communication line, or the like. The communication network 14 may also include (i) a mobile communication network such as a mobile phone line network, or may also include (ii) a wireless communication network such as a wireless MAN (for example, WiMAX (registered trademark)), a wireless LAN (for example, WiFi (registered trademark)), Bluetooth (registered trademark), Zigbee (registered trademark), or NFC (Near Field Communication).

In the present embodiment, each unit of the energy management system 100 may transmit and receive information to and from at least one of one or more fuel cell vehicles 22 and one or more electric vehicles 24 via the communication network 14. In the present embodiment, each unit of the energy management system 100 may transmit and receive information to and from at least one of one or more communication terminals 32 via the communication network 14.

In the present embodiment, at least one of the agricultural facility 122 and the energy management facility 124 may transmit and receive hydrogen to and from the fuel cell vehicle 22. For example, at least one of the agricultural facility 122 and the energy management facility 124 is configured to transfer at least one of hydrogen generated by the facility and hydrogen stored in the facility to a hydrogen storage container of the fuel cell vehicle 22. At least one of the agricultural facility 122 and the energy management facility 124 may receive hydrogen from the hydrogen storage container of the fuel cell vehicle 22.

In the present embodiment, at least one of the agricultural facility 122 and the energy management facility 124 may transmit and receive electric power to and from the electric vehicle 24. For example, at least one of the agricultural facility 122 and the energy management facility 124 is configured to charge a storage battery of the electric vehicle 24 with electric power generated by the facility. At least one of the agricultural facility 122 and the energy management facility 124 may receive electric power from the storage battery of the electric vehicle 24.

The fuel cell vehicle 22 and the electric vehicle 24 may be a property or a possession of a service provider of dispatching a movable object equipped with a hydrogen storage container or a storage battery (which may be referred to as an administrator of the fuel cell vehicle 22 or the electric vehicle 24). For example, the fuel cell vehicle 22 and the electric vehicle 24 may be a property or a possession of a business operator that provides a car rental service.

The electric vehicle 24 may be one example of a movable object that can be equipped with a storage battery. The fuel cell vehicle 22 may be one example of a movable object that can be equipped with a fuel cell. The fuel cell vehicle 22 may be one example of a movable object that can be equipped with a hydrogen storage container.

The hydrogen storage container equipped on the fuel cell vehicle 22 may be one example of a portable hydrogen storage container. The portable hydrogen storage container is configured to be carried by an animal or a movable object. The portable hydrogen storage container may be mounted on or carried by an animal, may be equipped on a movable object, or may be tracted by a movable object. The storage battery equipped on the electric vehicle 24 may be one example of a portable power storage device. The portable power storage device is configured to be carried by an animal or a movable object. The portable power storage device may be mounted on or carried by an animal, may be equipped on a movable object, or may be tracted by a movable object.

The movable object may be equipment configured to run on the land, equipment configured to fly in the air, or equipment configured to navigate in or on the water. The movable object may be moved by user operation or by an autonomous movement function enabled by a computer equipped on the movable object (which may be referred to as auto-cruise, cruise control, or the like.) Examples of the movable object include a wheeled vehicle, a marine vessel, a flight vehicle, or the like. Examples of the wheeled vehicle include an automobile, a motorcycle, a train, or the like.

Examples of the automobile include an engine vehicle, an electric vehicle, a fuel cell vehicle, a hybrid car, a work machine, or the like. Examples of the motorcycle include (i) a motor bike, (ii) a motor trike, (iii) a standing ride motorcycle with a power unit like a Segway (registered trademark), a Kickboard (registered trademark) with a power unit, and a skateboard with a power unit, or the like. Examples of the marine vessel include a ship, a hovercraft, a water bike, a submarine ship, a submarine boat, a water scooter, or the like. Examples of the flight vehicle include an airplane, an airship or a balloon, an aerostat, a helicopter, a drone, or the like.

In the present embodiment, the communication terminal 32 is a communication terminal utilized by a user of the energy management system 100, and details thereof are not particularly limited. Examples of the communication terminal 32 include a personal computer, a mobile terminal, or the like. Examples of the mobile terminal include a mobile phone, a smartphone, a PDA, a tablet, a notebook computer or a laptop computer, a wearable computer, or the like. The communication terminal 32 may be used as a user interface of the energy management system 100.

In the present embodiment, the energy management system 100 is configured to manage supply/demand of energy in the agricultural facility 122, the energy management facility 124, and the supplier/demander facility 126. The energy management system 100 may manage supply/demand of an energy source in the agricultural facility 122, the energy management facility 124, and the supplier/demander facility 126. Examples of the energy include electricity, heat, or the like. Examples of the energy source include hydrogen, town gas, propane gas, alcohol, petroleum, kerosene, gasoline, or the like.

In the present embodiment, the agricultural facility 122 is configured to receive electric power from the power grid 12 (which may be referred to as power reception, power purchase, or the like). The agricultural facility 122 may supply electric power to the power grid 12 (which may be referred to as power transmission, power selling, or the like). The agricultural facility 122 is provided with, for example, at least one of a device configured to consume electric power, a device configured to supply electric power, a device configured to consume hydrogen, and a device configured to supply hydrogen.

In the present embodiment, the agricultural facility 122 includes a farm field in which plants or agricultural products are cultivated. In the agricultural facility 122, for example, heat that occurs upon generation of electric power and hydrogen is supplied to the farm field. Water or vapor that occur upon generation of electric power and hydrogen may be supplied to the farm field. Carbon dioxide that occurs upon generation of hydrogen may be supplied to the farm field. The agricultural facility 122 may be a facility including a farm field among other supplier/demander facilities 126. Details of the agricultural facility 122 will be described below.

In the present embodiment, the energy management facility 124 is configured to manage a supply amount of energy. Thus, a balance of demand and supply of the energy is maintained. The energy management facility 124 may manage a supply amount of an energy source. Thus, a balance of demand and supply of the energy source is maintained. For example, the energy management facility 124 is provided with a power generation apparatus, a power storage apparatus, a hydrogen production apparatus, or the like. Details of the energy management facility 124 will be described below.

In the present embodiment, the supplier/demander facility 126 is configured to receive electric power from the power grid 12. The supplier/demander facility 126 may supply electric power to the power grid 12. For example, at least one of a device configured to consume electric power and a device configured to supply electric power is provided in the supplier/demander facility 126. At least one of a device configured to consume hydrogen and a device configured to supply hydrogen may be provided in the supplier/demander facility 126. The supplier/demander facility 126 may have a similar configuration to the agricultural facility 122, except that the supplier/demander facility 126 does not include a farm field.

In the present embodiment, the energy management unit 132 of the management server 130 is configured to manage the supply/demand of energy in the agricultural facility 122, the energy management facility 124, and the supplier/demander facility 126. The management server 130 may manage supply/demand of an energy source in the agricultural facility 122, the energy management facility 124, and the supplier/demander facility 126. Details of the energy management unit 132 will be described below.

In the present embodiment, the vehicle allocation management unit 134 of the management server 130 is configured to manage one or more fuel cell vehicles 22 and one or more electric vehicles 24. The vehicle allocation management unit 134 may adjust supply/demand of the energy or energy source by dispatching a fuel cell vehicle 22 or an electric vehicle 24 to at least one of the energy management facility 124 and the supplier/demander facility 126. Details of the vehicle allocation management unit 134 will be described below.

For example, the fuel cell vehicle 22 can carry hydrogen between at least two of the agricultural facility 122, the energy management facility 124, and the supplier/demander facility 126. The electric vehicle 24 can carry electricity between at least two of the agricultural facility 122, the energy management facility 124, and the supplier/demander facility 126.

The fuel cell vehicle 22 may supply hydrogen to at least one of the agricultural facility 122, the energy management facility 124, and the supplier/demander facility 126. The fuel cell vehicle 22 may receive hydrogen from at least one of the agricultural facility 122, the energy management facility 124, and the supplier/demander facility 126. The fuel cell vehicle 22 and the electric vehicle 24 may supply electric power to at least one of the agricultural facility 122, the energy management facility 124, and the supplier/demander facility 126. The electric vehicle 24 may receive electric power from at least one of the agricultural facility 122, the energy management facility 124, and the supplier/demander facility 126.

[Specific Configuration of Each Unit of the Energy Management System 100]

Each unit of the energy management system 100 may be implemented by hardware, software, or a combination of hardware and software. At least part of each unit of the energy management system 100 may be implemented by a single server or a plurality of servers. At least part of each unit of the energy management system 100 may be implemented on a virtual machine or a cloud system.

At least part of each unit of the energy management system 100 may be implemented by a personal computer or a mobile terminal. Examples of the mobile terminal include a mobile phone, a smartphone, a PDA, a tablet, a notebook computer or a laptop computer, a wearable computer, or the like. Each unit of the energy management system 100 may store information by utilizing a distributed ledger technology or a distributed network such as a blockchain.

When at least some components constituting the energy management system 100 are implemented by software, the components implemented by software may be implemented in an information processing device having a common configuration by activating a program in which operations related to the components are defined. The information processing device includes, for example, (i) a data processing device having a processor such as a CPU or a GPU, a ROM, a RAM, a communication interface, or the like, (ii) a input device such as a keyboard, a touch panel, a camera, a microphone, various sensors, a GPS receiver, or the like, (iii) an output device such as a display device, a speaker, a vibrator, and (iv) a storage device such as a memory, an HDD (including an external storage device).

In the information processing device, the data processing device or the storage device may store a program. The program may be stored in a non-transitory computer-readable recording medium. The program is configured to be executed by a processor to thereby cause the information processing device to execute operations defined by the program.

The program may be stored on a computer-readable medium such as a CD-ROM, a DVD-ROM, a memory, a hard disk, or may be stored on a storage device connected to a network. The program may be installed in a computer constituting at least part of the energy management system 100 from the computer-readable medium or the storage device connected to a network. By the program being executed, the computer may function as at least part of each unit of the energy management system 100.

The program causing the computer to function as at least part of each unit of the energy management system 100 may include a module configured to regulate the operations of each unit of the energy management system 100. The program or module act on the data processing device, the input device, the output device, the storage device, or the like to cause the computer to function as each unit of the energy management system 100 and to execute the information processing method in each unit of the energy management system 100. When the program is read by the computer, the information processing described in the program function as a specific means in which software related to the program and a variety of hardware resources of the energy management system 100 cooperate. An energy management system 100 suitable for an intended use is constructed by the specific means realizing calculations or processings of information appropriate for the intended use of the computer in the present embodiment.

The program may be a program for causing the computer to execute a variety of information processing methods in the management server 130. In one embodiment, the information processing method in the management server 130 includes, for example, acquiring first supply/demand information indicating power supply/demand and hydrogen supply/demand in a hydrogen generation system configured to generate hydrogen by utilizing electric power. The information processing method include, for example, acquiring second supply/demand information indicating power supply/demand and hydrogen supply/demand in each of one or plurality of tri-generation systems. The information processing method includes, for example, managing supply/demand by determining, based on the first supply/demand information and the second supply/demand information, at least one of (i) an upper limit value of power amount that the hydrogen generation system can receive from a power grid during a certain period, (ii) a target value of amount of hydrogen that the hydrogen generation system generates during the certain period, (iii) an upper limit value of power amount that each of the one or plurality of tri-generation systems can transmit to the power grid during the certain period, and (iv) a target value of power amount that each of the one or plurality of tri-generation systems generates during the certain period.

In another embodiment, the information processing method in the management server 130 may be a control method for controlling an energy generator. In the control method, the energy generator includes, for example, a reformation unit configured to degrade raw material gas including hydrogen and carbon by utilizing electric power and generate hydrogen and carbon dioxide, a hydrogen storage unit configured to store hydrogen, and a power generation unit configured to generate electric power by utilizing at least one of hydrogen generated by the reformation unit and hydrogen stored in the hydrogen storage unit.

The control method includes, for example, acquiring a supply request for requesting supply of carbon dioxide. The control method includes, for example, acquiring power supply/demand information indicating a power supply/demand situation in the energy generator or a power grid that can transmit and receive electric power to and from the energy generator. The control method includes, for example, acquiring hydrogen supply/demand information indicating a hydrogen supply/demand situation in the energy generator. The control method includes, for example, determining whether to respond to the supply request, based on (i) the power supply/demand situation indicated by the power supply/demand information and (ii) the hydrogen supply/demand situation indicated by the hydrogen supply/demand information.

Figure 2:
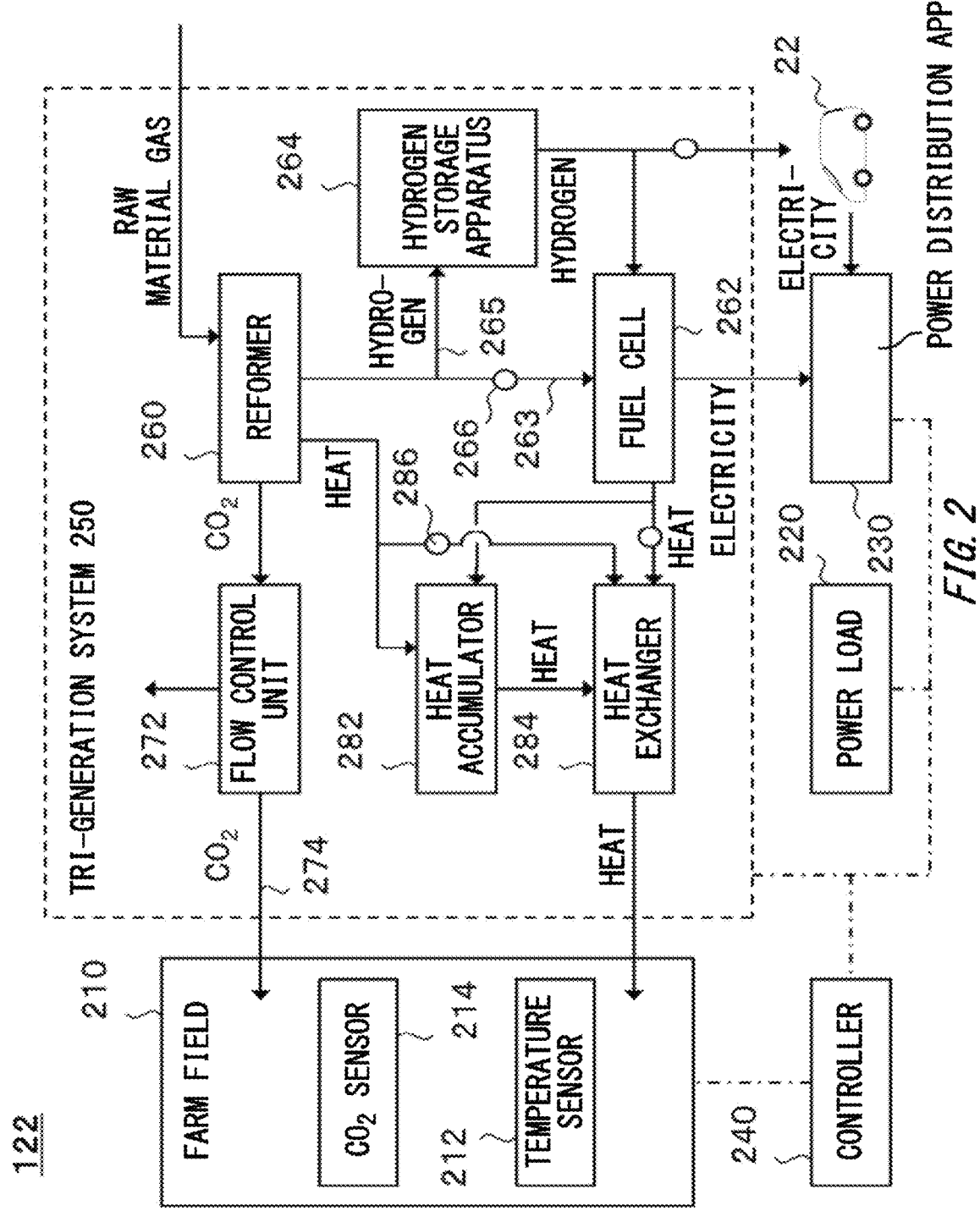
FIG. 2 schematically shows one example of a system configuration of an agricultural facility 122.

FIG. 2 schematically shows one example of a system configuration of an agricultural facility 122. In the present embodiment, the agricultural facility 122 includes, for example, a farm field 210, a power load 220, a power distribution apparatus 230, a controller 240, and a tri-generation system 250. In the present embodiment, the farm field 210 is provided with a temperature sensor 212 and a carbon dioxide sensor 214, for example. In the present embodiment, the tri-generation system 250 includes, for example, a reformer 260, a fuel cell 262, a pipe 263, a hydrogen storage apparatus 264, a pipe 265, and an automatic valve 266. The tri-generation system 250 may include a flow control unit 272 and a pipe 274. The tri-generation system 250 may include a heat accumulator 282, a heat exchanger 284, and an automatic valve 286. Note that, at a position indicated by a circle in FIG. 2, a transfer limitation member such as an automatic valve and a flow regulation valve may be provided.

The controller 240 may be one example of an energy management device. The tri-generation system 250 may be one example of an energy generator, a first tri-generation system, and a second tri-generation system. The reformer 260 may be one example of a carbon dioxide generation unit, a heat generation unit, and a reformation unit. The fuel cell 262 may be one example of a power generation unit and a heat generation unit. The pipe 263 may be one example of a first pipe. The hydrogen storage apparatus 264 may be one example of a hydrogen storage unit. The pipe 265 may be one example of a second pipe. The automatic valve 266 may be one example of a transfer limitation unit.

In the present embodiment, plants or agricultural products are cultivated in the farm field 210. Examples of agricultural products can include grains, vegetables, fruits, teas, mushrooms or mycelia, or the like. One or more temperature sensors 212 may be provided in the farm field 210. The temperature sensor 212 is configured to measure an air temperature, a water temperature, a temperature of the soil, or the like at various locations of the farm field 210. One or more carbon dioxide sensors 214 may be provided in the farm field 210. Carbon dioxide sensor 214 is configured to measure a carbon dioxide concentration in the air at various locations in the farm field 210. The temperature sensor 212 and the carbon dioxide sensor 214 may output information indicating the measurement result to the controller 240.

The temperature sensor 212 and the carbon dioxide sensor 214 may be one example of a sensor provided in the farm field 210. In addition to the temperature sensor 212 and the carbon dioxide sensor 214, a variety of sensors may be provided in the farm field 210. For example, a humidity sensor is provided in the farm field 210.

In the present embodiment, the power load 220 is configured to use electricity. The power load 220 may be an electrical appliance configured to consume electric power. At least some operations of the power load 220 may be controlled by the controller 240.

In the present embodiment, the power distribution apparatus 230 is configured to control power distribution between the power grid 12 and interior wiring of the agricultural facility 122. For example, the power distribution apparatus 230 is configured to control power exchange between the power grid 12 and the tri-generation system 250. The power distribution apparatus 230 may control power distribution inside the agricultural facility 122. For example, the power distribution apparatus 230 is configured to control power supply from the tri-generation system 250 to the power load 220. The power distribution apparatus 230 may convert alternate current to direct current or direct current to alternate current. The power distribution apparatus 230 may adjust at least one of a voltage and a frequency of electricity. Operations of the power distribution apparatus 230 may be controlled by the controller 240.

The power distribution apparatus 230 may include one or plurality of electricity meters. The power distribution apparatus 230 may measure at least one of an instantaneous power [kW] and a power amount [kWh] of electricity supplied to the agricultural facility 122 from the power grid 12. The power distribution apparatus 230 may measure at least one of an instantaneous power [kW] and a power amount [kWh] of electricity supplied to the power grid 12 from the agricultural facility 122. The power distribution apparatus 230 may measure at least one of an instantaneous power [kW] and power amount [kWh] of electricity generated by the tri-generation system 250. The power distribution apparatus 230 may measure at least one of an instantaneous power [kW] and power amount [kWh] of electricity consumed by one or more electrical appliances provided inside the agricultural facility 122. The power distribution apparatus 230 may output information indicating at least one of the measured instantaneous power [kW] and power amount [kWh] to the controller 240.

In the present embodiment, the controller 240 is configured to control operations of the power load 220, the power distribution apparatus 230, and the tri-generation system 250. The controller 240 is configured to acquire information indicating measurement results of the temperature sensor 212 and the carbon dioxide sensor 214. The controller 240 may control operations of at least one of the power load 220, the power distribution apparatus 230 and the tri-generation system 250 based on the measurement results of at least one of the temperature sensor 212 and the carbon dioxide sensor 214.

In the present embodiment, the controller 240 is configured to manage supply/demand of the energy and the energy source in the agricultural facility 122. The controller 240 is configured to acquire, for example, information indicating at least one of (i) a power consumption amount in the power load 220, (ii) a power consumption amount and a power generation amount in the tri-generation system 250, (iii) a hydrogen consumption amount, a hydrogen generation amount, and a remaining amount of hydrogen in the tri-generation system 250, (iv) a carbon dioxide generation amount in the tri-generation system 250, and (v) a heat consumption amount, a heat generation amount and a heat storage amount in the tri-generation system 250. The controller 240 may control operations of at least one of the power load 220, the power distribution apparatus 230, and the tri-generation system 250 based on the above-mentioned information.

In the present embodiment, the controller 240 is configured to cooperate with the management server 130 to adjust excess or deficiency of energy and an energy source in the agricultural facility 122 or a community to which the agricultural facility 122 belongs. The controller 240 is configured to send, to the management server 130, information relating to a supply/demand condition of at least one of the energy and the energy source in the agricultural facility 122, for example. The controller 240 may send a request for adjusting excess or deficiency of the energy and the energy source in the agricultural facility 122 to the management server 130.

The controller 240 may acquire information relating to a supply/demand condition of at least one of the energy and the energy source in the community from the management server 130. The controller 240 may manage power transmission and reception between the agricultural facility 122 and the power grid 12 based on the information acquired from the management server 130. Details of the controller 240 will be described below.

In the present embodiment, the tri-generation system 250 is configured to generate electricity, heat and carbon dioxide and supply them to the outside. The tri-generation system 250 may generate hydrogen and supply the hydrogen to the outside. For example, the tri-generation system 250 is configured to supply heat and carbon dioxide to the farm field 210. The tri-generation system 250 is configured to supply electric power to the power load 220 or the power grid 12.

In the present embodiment, the reformer 260 is configured to degrade raw material gas including hydrogen and carbon and generate hydrogen and carbon dioxide. The reformer 260 may degrade raw material gas and generate heat. The reformer 260 may degrade raw material gas by utilizing electric power. The hydrogen generated by the reformer 260 is transferred, for example, to the fuel cell 262 via the pipe 263. The hydrogen generated by the reformer 260 is transferred, for example, to the hydrogen storage apparatus 264 via the pipe 265. The hydrogen generated by the reformer 260 is transferred, for example, to the farm field 210 via the pipe 274. The heat generated by the reformer 260 is transferred, for example, to at least one of the heat accumulator 282 and the heat exchanger 284 via any transfer pipe for a heat medium.

In the present embodiment, the fuel cell 262 is configured to generate electric power by utilizing hydrogen. The fuel cell 262 may generate heat by utilizing hydrogen. At least one of the hydrogen generated by the reformer 260 and the hydrogen stored in the hydrogen storage apparatus 264 is supplied to the fuel cell 262. The fuel cell 262 may supply electric power to at least one of the power grid 12 and the farm field 210 via the power distribution apparatus 230.

The heat generated by the fuel cell 262 is transferred to, for example, at least one of the heat accumulator 282 and the heat exchanger 284 via any transfer pipe for a heat medium. The pipe for supplying heat to the heat accumulator 282 from the fuel cell 262 may be provided with a member for limiting transfer of a heat medium. The pipe for supplying heat to the heat exchanger 284 from the fuel cell 262 may be provided with a member for limiting transfer of a heat medium. The member for limiting transfer of a heat medium may be an automatic valve. Operations of the automatic valve may be controlled by the controller 240 or a control device (not shown) of the tri-generation system 250.

In the present embodiment, the hydrogen storage apparatus 264 is configured to store hydrogen supplied from the outside. For example, the hydrogen storage apparatus 264 is configured to store hydrogen supplied from the reformer 260 in a hydrogen storage container (not shown). The hydrogen storage apparatus 264 may store hydrogen supplied from the fuel cell vehicle 22 in the hydrogen storage container. A method of storing hydrogen is not particularly limited. Hydrogen may be stored under relatively high pressure or under relatively low pressure. Hydrogen may be stored in a gas state, in a liquid state, or in a state of being absorbed in a hydrogen-occluding substance.

The hydrogen storage apparatus 264 may supply hydrogen to the outside. For example, the hydrogen storage apparatus 264 is configured to supply hydrogen to the fuel cell 262. The hydrogen storage apparatus 264 may supply hydrogen to the fuel cell vehicle 22. The pipe for supplying hydrogen to the fuel cell 262 from the hydrogen storage apparatus 264 may be provided with a member for limiting transfer of hydrogen. The pipe for supplying hydrogen to the fuel cell vehicle 22 from the hydrogen storage apparatus 264 may be provided with a member for limiting transfer of hydrogen. The member for limiting transfer of hydrogen may be an automatic valve. Operations of an automatic valve may be controlled by the controller 240 or the control device (not shown) of the tri-generation system 250.

In the present embodiment, the automatic valve 266 is configured to limit transfer of hydrogen in at least one of the pipe 263 and the pipe 265. Thus, a transfer destination and a transfer amount of hydrogen generated by the reformer 260 are controlled. Operations of the automatic valve 266 may be controlled by the controller 240 or the control device (not shown) of the tri-generation system 250.

In the present embodiment, the flow control unit 272 is configured to limit transfer of carbon dioxide to the farm field 210 from the reformer 260. The flow control unit 272 may be provided in some region of the pipe 274. Thus, a transfer amount of carbon dioxide to the farm field 210 is controlled. Operations of the flow control unit 272 may be controlled by the controller 240 or the control device (not shown) of the tri-generation system 250. Details of the flow control unit 272 will be described below.

In the present embodiment, the heat accumulator 282 is configured to accumulate heat generated by at least one of the reformer 260 and the fuel cell 262. In the present embodiment, the heat exchanger 284 is configured to convey the heat generated by at least one of the reformer 260 and the fuel cell 262 or the heat accumulated in the heat accumulator 282 to a temperature adjustment device (not shown) of the farm field 210. A heat exchange system in the heat exchanger 284 is not particularly limited.

In the present embodiment, the automatic valve 286 is configured to limit transfer of a heat medium for conveying heat generated by the reformer 260. The automatic valve 286 is configured to limit transfer of a heat medium in at least one of a pipe for transferring a heat medium to the heat accumulator 282 from the reformer 260 and a pipe for transferring a heat medium to the heat exchanger 284 from the reformer 260. Thus, a transfer destination and a transfer amount of heat generated by the reformer 260 are controlled. Operations of the automatic valve 286 may be controlled by the controller 240 or the control device (not shown) of the tri-generation system 250.

Figure 3:
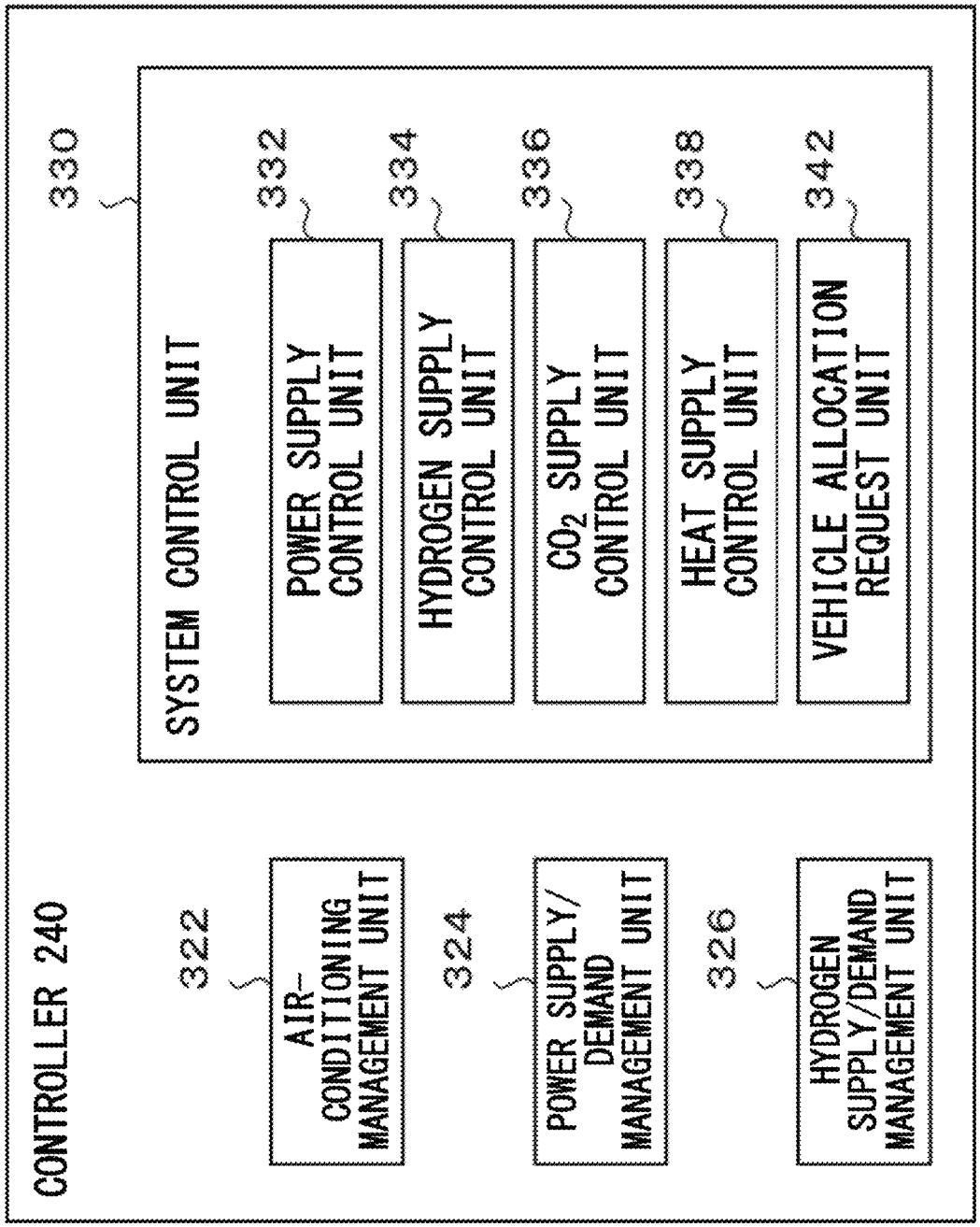
FIG. 3 schematically shows one example of an internal configuration of a controller 240.

FIG. 3 schematically shows one example of an internal configuration of the controller 240. In the present embodiment, the controller 240 includes, for example, an air-conditioning management unit 322, a power supply/demand management unit 324, a hydrogen supply/demand management unit 326, and a system control unit 330. In the present embodiment, the system control unit 330 includes a power supply control unit 332, a hydrogen supply control unit 334, a carbon dioxide supply control unit 336, a heat supply control unit 338, and a vehicle allocation request unit 342.

The power supply/demand management unit 324 may be one example of a power supply/demand acquisition unit. The hydrogen supply/demand management unit 326 may be one example of a hydrogen supply/demand acquisition unit. The system control unit 330 may be one example of an energy management device. The power supply control unit 332 may be one example of a power generation control unit. The carbon dioxide supply control unit 336 may be one example of a supply request acquisition unit and a response determination unit. The vehicle allocation request unit 342 may be one example of a dispatch request transmission unit.

In the present embodiment, the air-conditioning management unit 322 is configured to manage at least one of a temperature, humidity and a carbon dioxide concentration in the farm field 210. The air-conditioning management unit 322 may manage at least one of a temperature, humidity and a carbon dioxide concentration of the air in the farm field 210. The air-conditioning management unit 322 may manage at least one of a temperature and humidity in a medium of the farm field 210.

The air-conditioning management unit 322 is configured to acquire information indicating measurement results of a variety of sensors provided in the farm field 210. The air-conditioning management unit 322 is configured to output a variety of requests to the system control unit 330 based on the measurement results of the sensors. For example, the air-conditioning management unit 322 is configured to output a heat request for requesting supply of heat based on a measurement result of the temperature sensor 212. The air-conditioning management unit 322 may output a carbon dioxide request for requesting supply of carbon dioxide based on a measurement result of the carbon dioxide sensor 214. The air-conditioning management unit 322 is configured to output a humidification request for requesting humidification based on a measurement result of the humidity sensor. The carbon dioxide request may be one example of a supply request.

In the present embodiment, the power supply/demand management unit 324 is configured to manage power supply/demand in the agricultural facility 122. For example, the power supply/demand management unit 324 is configured to acquire information indicating power supply/demand situation (which may be referred to as power supply/demand information) in the agricultural facility 122.

The power supply/demand management unit 324 may acquire, from the power distribution apparatus 230, information indicating a power consumption amount in the agricultural facility 122. The power supply/demand management unit 324 may acquire, from the power distribution apparatus 230, information indicating a power supply amount in the agricultural facility 122. The power supply/demand management unit 324 may acquire, from the power distribution apparatus 230, information indicating a power generation amount of the tri-generation system 250. The power supply/demand management unit 324 may acquire, from the power distribution apparatus 230, information indicating a power transmission amount to the power grid 12 from the agricultural facility 122. The power supply/demand management unit 324 may predict a power consumption amount in the agricultural facility 122. The power supply/demand management unit 324 may predict a power supply amount in the agricultural facility 122.

The power supply/demand management unit 324 may acquire, from the management server 130, information indicating a power supply/demand situation in a community to which the agricultural facility 122 belongs. The power supply/demand situation in the community may be power supply/demand information in the power grid 12. The content indicated by the power supply/demand information of the community may be similar to that of the power supply/demand information of the agricultural facility 122. The power supply/demand situation in the community may be one example of a power supply/demand situation in the agricultural facility 122.

In the present embodiment, the hydrogen supply/demand management unit 326 is configured to manage hydrogen supply/demand in the agricultural facility 122. For example, the hydrogen supply/demand management unit 326 is configured to acquire information indicating a hydrogen supply/demand situation in the agricultural facility 122 (which may be referred to as hydrogen supply/demand information).

The hydrogen supply/demand management unit 326 may acquire, from the tri-generation system 250, information indicating a hydrogen consumption amount in the fuel cell 262. The hydrogen supply/demand management unit 326 may acquire, from the tri-generation system 250, information indicating a hydrogen supply amount to the hydrogen storage container equipped on the fuel cell vehicle 22. The hydrogen supply/demand management unit 326 may acquire, from the tri-generation system 250, information indicating a hydrogen production amount in the reformer 260. The hydrogen supply/demand management unit 326 may acquire, from the tri-generation system 250, information indicating a remaining amount of hydrogen in the hydrogen storage apparatus 264. The hydrogen supply/demand management unit 326 may predict a hydrogen consumption amount in the tri-generation system 250. The hydrogen supply/demand management unit 326 may predict a hydrogen production amount in the tri-generation system 250. The hydrogen supply/demand management unit 326 may predict a remaining amount of hydrogen in the tri-generation system 250.

The hydrogen supply/demand management unit 326 may acquire, from the management server 130, information indicating a hydrogen supply/demand situation in a community to which the agricultural facility 122 belongs. The content indicated by the hydrogen supply/demand information of the community may be similar to that of the hydrogen supply/demand information of the agricultural facility 122. The hydrogen supply/demand situation in the community may be one example of a hydrogen supply/demand situation in the agricultural facility 122.

The system control unit 330 is configured to control operations of the power load 220, the power distribution apparatus 230, and the tri-generation system 250. The system control unit 330 may control communication between the controller 240 and the management server 130. The system control unit 330 may include a communication interface. The communication interface may be compatible with a plurality of communication systems.

In the present embodiment, the power supply control unit 332 is configured to control power supply in the tri-generation system 250. For example, the power supply control unit 332 is configured to determine whether to start the operation of the fuel cell 262. The power supply control unit 332 may determine whether to start operation of the fuel cell 262, based on (i) a power supply/demand situation in the agricultural facility 122 and (ii) a hydrogen supply/demand situation in the agricultural facility 122.

In one embodiment, the power supply control unit 332 is configured to generate an operation schedule in which information indicating one or more periods and a power generation amount during each period are associated with each other, based on (i) a power supply/demand situation in the agricultural facility 122 and (ii) a hydrogen supply/demand situation in the agricultural facility 122. The power supply control unit 332 is configured to start operation of the fuel cell 262 according to the operation schedule.

In another embodiment, the power supply control unit 332 may determine whether to start operation of the fuel cell 262 based on an excessiveness of power supply in the agricultural facility 122. For example, the power supply control unit 332 is configured to determine not to start operation of the fuel cell 262 or to stop operation of the fuel cell 262 when the excessiveness of power supply in the agricultural facility 122 satisfies a particular condition (which may be referred to as a power excess condition). The power supply control unit 332 may determine to start operation of the fuel cell 262 when the excessiveness of power supply in the agricultural facility 122 does not satisfy the above-mentioned condition.

The excessiveness of power supply may be a parameter indicating a degree of excess or tightness of electric power. The excessiveness of power supply may be represented by continuous numerical values or by stepwise segments. Each segment may be distinguished by symbols or characters, or by numbers.

The excessiveness of power supply/demand may be determined based on at least one of surplus power and remaining power supply capability. For example, the excessiveness of power supply/demand is determined based on (i) a ratio of the surplus power or the remaining supply capability in the agricultural facility 122 to the demand power in the agricultural facility 122, (ii) a ratio of the surplus power or the remaining supply capability in the agricultural facility 122 to the power supply capability in the agricultural facility 122, or the like.

The excessiveness of power supply/demand may be determined based on the power supply/demand situation in the community to which the agricultural facility 122 belongs. For example, the excessiveness of power supply/demand is determined based on (i) a ratio of the surplus power or the remaining supply capability in the power grid 12 to the demand power in the community, (ii) a ratio of the surplus power or the remaining supply capability in the community to the power supply capability in the power grid 12, or the like. The power supply/demand situation in the power grid 12 may be one example of a power supply/demand situation in the community to which the agricultural facility 122 belongs.

The power supply control unit 332 may control power supply to at least one of the one or more power loads 220. Thus, the power supply control unit 332 can adjust power supply/demand of the agricultural facility 122 by limiting consumption of electric power in the agricultural facility 122.

In the present embodiment, the hydrogen supply control unit 334 is configured to control hydrogen supply in the tri-generation system 250. For example, the hydrogen supply control unit 334 is configured to determine whether to start operation of the reformer 260. The hydrogen supply control unit 334 may determine whether to start operation of the reformer 260 based on (i) a power supply/demand situation in the agricultural facility 122 and (ii) a hydrogen supply/demand situation in the agricultural facility 122.

In one embodiment, the hydrogen supply control unit 334 is configured to generate an operation schedule in which information indicating one or more periods and a hydrogen generation amount during each period are associated with each other, based on (i) the power supply/demand situation in the agricultural facility 122 and (ii) the hydrogen supply/demand situation in the agricultural facility 122. The hydrogen supply control unit 334 is configured to start operation of the reformer 260 according to the operation schedule.

In another embodiment, the hydrogen supply control unit 334 may determine whether to start operation of the reformer 260 based on an excessiveness of hydrogen supply in the agricultural facility 122. For example, the hydrogen supply control unit 334 is configured to determine not to start operation of the reformer 260 or to stop operation of the reformer 260 when the excessiveness of hydrogen supply in the agricultural facility 122 satisfies a particular condition (which may be referred to as a hydrogen excess condition). The hydrogen supply control unit 334 may determine to start operation of the reformer 260 when the excessiveness of power supply in the agricultural facility 122 does not satisfy the above-mentioned condition.

The excessiveness of hydrogen supply may be a parameter indicating a degree of excess or tightness of hydrogen. The excessiveness of hydrogen supply may be represented by continuous numerical values or by stepwise segments. Each segment may be distinguished by symbols or characters, or by numerals.

The excessiveness of hydrogen supply/demand may be determined based on at least one of a surplus hydrogen amount and a remaining hydrogen supply capability. For example, the excessiveness of hydrogen supply/demand is determined based on (i) a ratio of the surplus hydrogen amount or the remaining supply capability in the agricultural facility 122 to the hydrogen demand amount in the agricultural facility 122, (ii) a ratio of the surplus hydrogen amount or the remaining supply capability in the agricultural facility 122 to the hydrogen supply capability in the agricultural facility 122, or the like.

The excessiveness of hydrogen supply/demand may be determined based on the hydrogen supply/demand situation in the community to which the agricultural facility 122 belongs. For example, the excessiveness of hydrogen supply/demand is determined based on (i) a ratio of the surplus hydrogen amount or the remaining supply capability in the community to the hydrogen demand amount in the community, (ii) a ratio of the surplus hydrogen amount or the remaining supply capability in the community to the hydrogen supply capability in the community, or the like.

In the present embodiment, the hydrogen supply control unit 334 is configured to control a supply path and a supply amount of hydrogen generated by the reformer 260. For example, the hydrogen supply control unit 334 is configured to control operations of the automatic valve 266. Thus, the hydrogen supply control unit 334 can control a transfer destination of the hydrogen and a transfer amount to each transfer destination.

In the present embodiment, the carbon dioxide supply control unit 336 is configured to control carbon dioxide supply in the tri-generation system 250. For example, the carbon dioxide supply control unit 336 is configured to determine whether to start operation of the reformer 260. The carbon dioxide supply control unit 336 may determine whether to start operation of the reformer 260, based on (i) a power supply/demand situation in the agricultural facility 122 and (ii) a hydrogen supply/demand situation in the agricultural facility 122.

For example, the carbon dioxide supply control unit 336 is configured to acquire a carbon dioxide request outputted from the air-conditioning management unit 322. The carbon dioxide supply control unit 336 is configured to acquire power supply/demand information of the agricultural facility 122 from the power supply/demand management unit 324. The carbon dioxide supply control unit 336 is configured to acquire hydrogen supply/demand information of the agricultural facility 122 from the hydrogen supply/demand management unit 326. The carbon dioxide supply control unit 336 is configured to determine whether to respond to the carbon dioxide request, based on (i) a power supply/demand situation indicated by the power supply/demand information and (ii) a hydrogen supply/demand situation indicated by the hydrogen supply/demand information.

In one embodiment, when the excessiveness of hydrogen supply indicated by the hydrogen supply/demand information satisfies a hydrogen excess condition and the excessiveness of power supply indicated by the power supply/demand information satisfies a power excess condition, the carbon dioxide supply control unit 336 determines not to respond to the carbon dioxide request. In another embodiment, when the excessiveness of hydrogen supply indicated by the hydrogen supply/demand information does not satisfy the hydrogen excess condition and the excessiveness of power supply indicated by the power supply/demand information satisfies the power excess condition, the carbon dioxide supply control unit 336 may determine to respond to the carbon dioxide request. When it is determined to respond to the carbon dioxide request, the carbon dioxide supply control unit 336 may execute at least one of a processing for starting operation of the reformer 260 and a processing for controlling the flow control unit 272.

When a request amount of carbon dioxide is specified in the carbon dioxide request, the carbon dioxide supply control unit 336 is configured to determine, for example, an excessiveness of hydrogen supply and an excessiveness of power supply in a condition in which the request amount of carbon dioxide is generated. When the determined excessiveness of hydrogen supply satisfies the hydrogen excess condition and the determined excessiveness of power supply satisfies the power excess condition, the carbon dioxide supply control unit 336 may determine not to respond to the carbon dioxide request.

In this case, the carbon dioxide supply control unit 336 may calculate an amount of carbon dioxide that the tri-generation system 250 can supply based on the supply/demand information of hydrogen and electric power, and notify the amount of carbon dioxide to the air-conditioning management unit 322. The air-conditioning management unit 322 may change the request amount of carbon dioxide and output a carbon dioxide request again. Note that the air-conditioning management unit 322 may output a carbon dioxide request for requesting supply of carbon dioxide within a range of an amount of carbon dioxide that the tri-generation system 250 can supply without a specified request amount of carbon dioxide.

In the present embodiment, the carbon dioxide supply control unit 336 is configured to control a supply path and a supply amount of carbon dioxide generated by the reformer 260. For example, the carbon dioxide supply control unit 336 is configured to control operations of the flow control unit 272. Thus, the carbon dioxide supply control unit 336 can control a transfer destination of carbon dioxide and a transfer amount to each transfer destination. Specifically, the carbon dioxide supply control unit 336 is configured to control a supply amount of carbon dioxide to the farm field 210.

In the present embodiment, the heat supply control unit 338 is configured to control supply of heat in the tri-generation system 250. For example, the heat supply control unit 338 is configured to determine whether to start operation of at least one of the reformer 260 and the fuel cell 262. The heat supply control unit 338 may determine whether to start operation of at least one the reformer 260 and the fuel cell 262 based on an amount of heat accumulated in the heat accumulator 282. The heat supply control unit 338 may determine whether to start operation of at least one of the reformer 260 and the fuel cell 262, based on (i) a power supply/demand situation in the agricultural facility 122 and (ii) a hydrogen supply/demand situation in the agricultural facility 122.

For example, the heat supply control unit 338 is configured to acquire a heat request outputted from the air-conditioning management unit 322. The heat supply control unit 338 is configured to determine whether to respond to the heat request based on an amount of heat accumulated in the heat accumulator 282. When the amount of heat requested by the heat request is equal to or less than the amount of heat accumulated in the heat accumulator 282, the heat supply control unit 338 may determine not to start operation of the reformer 260 and the fuel cell 262. Then, the heat supply control unit 338 is configured to start operation of the heat accumulator 282 and the heat exchanger 284 and execute a processing for supplying heat to the farm field 210.

On the other hand, when the amount of heat requested by the heat request exceeds the amount of heat accumulated in the heat accumulator 282, the heat supply control unit 338 is configured to acquire power supply/demand information of the agricultural facility 122 from the power supply/demand management unit 324. The heat supply control unit 338 is configured to acquire hydrogen supply/demand information of the agricultural facility 122 from the hydrogen supply/demand management unit 326. Moreover, the heat supply control unit 338 is configured to determine whether to respond to the heat request, based on (i) a power supply/demand situation indicated by the power supply/demand information and (ii) a hydrogen supply/demand situation indicated by the hydrogen supply/demand information.

In one embodiment, when the excessiveness of hydrogen supply indicated by the hydrogen supply/demand information satisfies a hydrogen excess condition and the excessiveness of power supply indicated by the power supply/demand information satisfies a power excess condition, the heat supply control unit 338 is configured to determine not to respond to the heat request. In another embodiment, when the excessiveness of hydrogen supply indicated by the hydrogen supply/demand information does not satisfy the hydrogen excess condition and the excessiveness of power supply indicated by the power supply/demand information satisfies the power excess condition, the heat supply control unit 338 may determine to respond to the heat request. The heat supply control unit 338 may determine which of the reformer 260 or the fuel cell 262 to run, based on the hydrogen supply/demand information and the power supply/demand information. When it is determined to respond to the heat request, the heat supply control unit 338 may execute at least one of a processing for starting operation of at least one of the reformer 260 and the fuel cell 262 and a processing for controlling the automatic valve 286.

When a request amount of heat is specified in the heat request, the heat supply control unit 338 is configured to determine, for example, an excessiveness of hydrogen supply and an excessiveness of power supply in a condition in which the request amount of heat is generated. When the determined excessiveness of hydrogen supply satisfies a hydrogen excess condition and the determined excessiveness of power supply satisfies a power excess condition, the heat supply control unit 338 may determine not to respond to the heat request.

In this case, the heat supply control unit 338 may calculate an amount of heat that the tri-generation system 250 can supply based on the supply/demand information of hydrogen and electric power, and notify the amount of heat to the air-conditioning management unit 322. The air-conditioning management unit 322 may change the request amount of heat and output a heat request again. Note that the air-conditioning management unit 322 may output a heat request for requesting supply of heat within a range of an amount of heat that the tri-generation system 250 can supply without a specified request amount of heat.

In the present embodiment, the vehicle allocation request unit 342 is configured to send a vehicle allocation request for requesting dispatch of at least one of the fuel cell vehicle 22 and the electric vehicle 24 to the management server 130. The vehicle allocation request may be a request for an administrator of the fuel cell vehicle 22 or the electric vehicle 24. For example, the vehicle allocation request unit 342 may send a vehicle allocation request when the excessiveness of hydrogen supply indicated by the hydrogen supply/demand information satisfies a hydrogen excess condition and the excessiveness of power supply indicated by the power supply/demand information satisfies a power excess condition. The vehicle allocation request may be one example of a dispatch request.

In one embodiment, when a remaining amount of hydrogen in the hydrogen storage apparatus 264 exceeds a predetermined threshold, the vehicle allocation request unit 342 is configured to send a vehicle allocation request for requesting dispatch of the fuel cell vehicle 22 to the management server 130. The vehicle allocation request may include information indicating a hydrogen discharge amount from the hydrogen storage apparatus 264. In another embodiment, when a power demand in the agricultural facility 122 exceeds a predetermined threshold, the vehicle allocation request unit 342 is configured to send a vehicle allocation request for requesting dispatch of the fuel cell vehicle 22 or the electric vehicle 24 to the management server 130. The vehicle allocation request may include information indicating an insufficient power amount in the agricultural facility 122.

Figure 4:
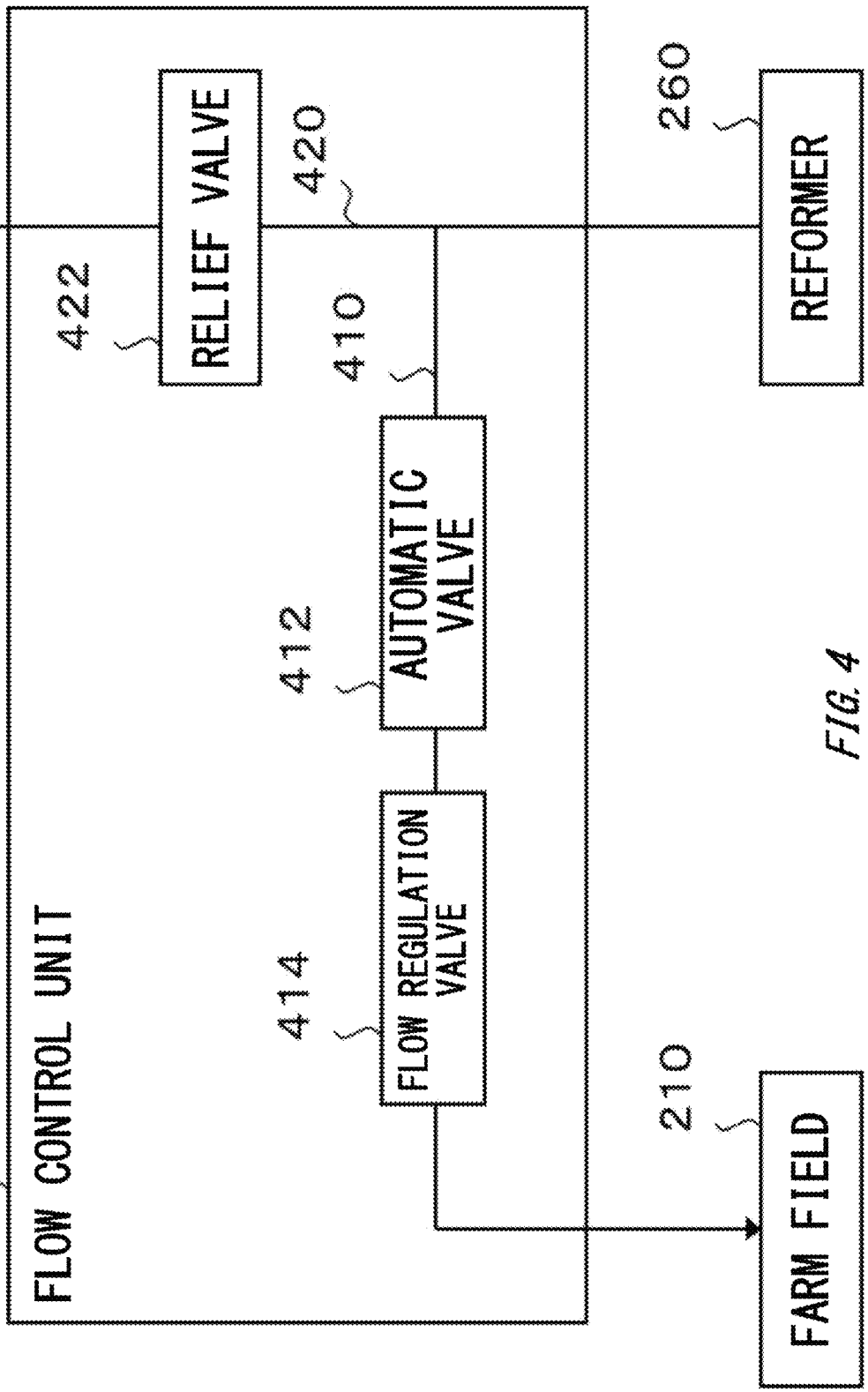
FIG. 4 schematically shows one example of an internal configuration of a flow control unit 272.

FIG. 4 schematically shows one example of an internal configuration of the flow control unit 272. In the present embodiment, the flow control unit 272 includes, for example, a pipe 410, an automatic valve 412, and a flow regulation valve 414. The flow control unit 272 may include a pipe 420 and a relief valve 422.

The pipe 410 and the pipe 420 is configured to transfer at least part of carbon dioxide generated by the reformer 260 to the farm field 210. The automatic valve 412 and the flow regulation valve 414 are provided in some region of the pipe 410, and are configured to adjust an amount of carbon dioxide transferred to the farm field 210. Operations of the automatic valve 412 may be controlled by the controller 240. The opening of the flow regulation valve 414 may be adjusted manually or may be controlled by the controller 240.

The relief valve 422 is provided in some region of the pipe 420. In the present embodiment, the pipe 420 is configured such that, when the reformer 260 generates carbon dioxide while the automatic valve 412 is closed, the pressure in the pipe 420 increases. When the pressure in the pipe 420 exceeds a set value of the relief valve 422, the relief valve 422 opens, and the carbon dioxide inside the pipe 420 is discharged into the air.

Figure 5:
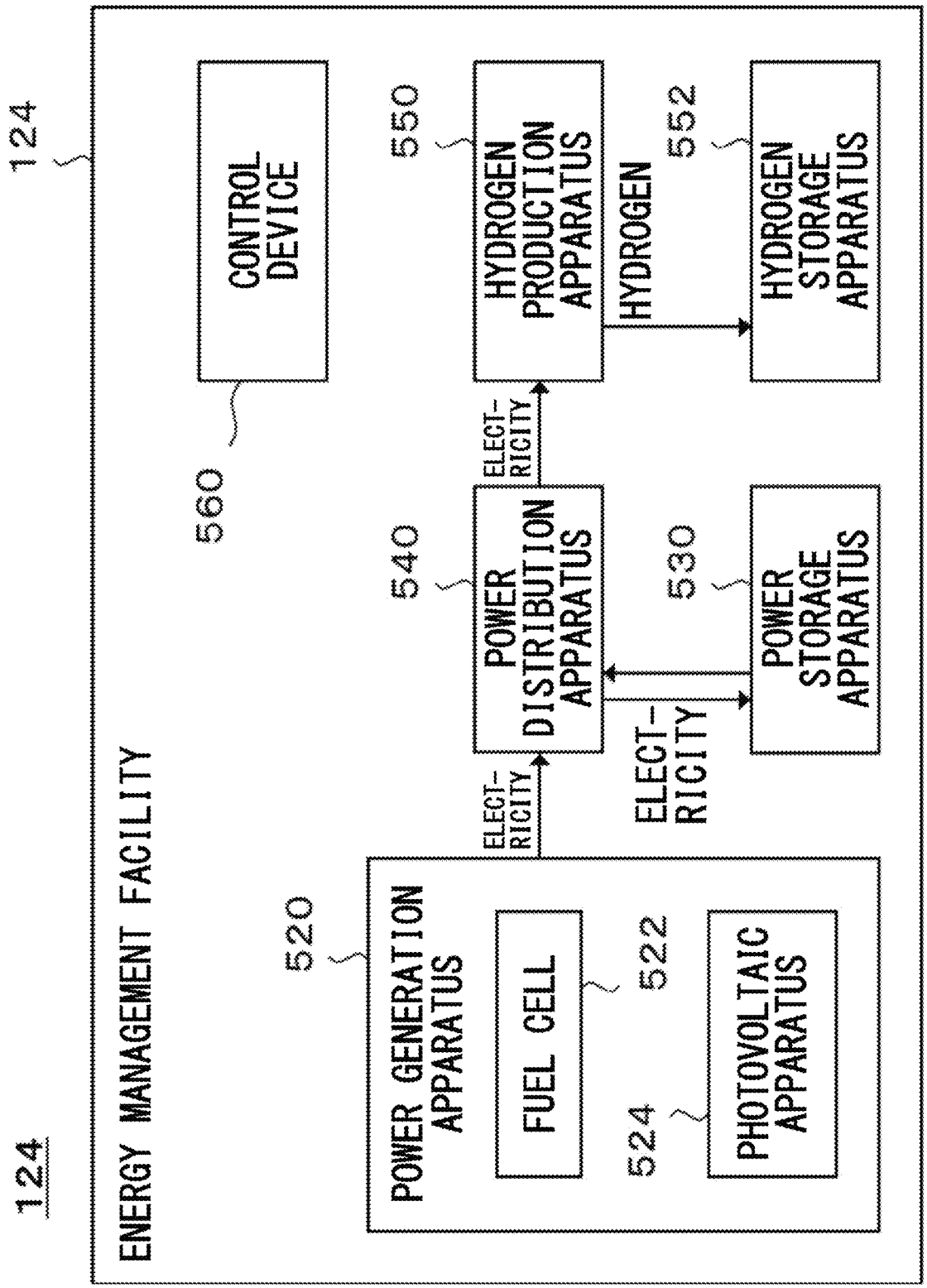
FIG. 5 schematically shows one example of a system configuration of an energy management facility 124.

FIG. 5 schematically shows one example of a system configuration of the energy management facility 124. In the present embodiment, the energy management facility 124 includes, for example, one or more power generation apparatuses 520, one or more power storage apparatuses 530, a power distribution apparatus 540, one or more hydrogen production apparatuses 550, one or more hydrogen storage apparatuses 552, and a control device 560. In the present embodiment, the power generation apparatus 520 includes, for example, one or more fuel cells 522. The power generation apparatus 520 may include one or more photovoltaic apparatuses 524.

In the present embodiment, the power generation apparatus 520 is configured to generate electric power. In the present embodiment, the power storage apparatus 530 is configured to accumulate electric power. Operations of the power generation apparatus 520 and the power storage apparatus 530 may be controlled by the control device 560.

In the present embodiment, the power distribution apparatus 540 is configured to control power distribution between the power grid 12 and interior wiring of the energy management facility 124. The power distribution apparatus 540 may control power distribution inside the energy management facility 124. The power distribution apparatus 540 may convert alternate current to direct current or direct current to alternate current. The power distribution apparatus 540 may adjust at least one of a voltage and a frequency of electricity. Operations of the power distribution apparatus 540 may be controlled by the control device 560.

In the present embodiment, the hydrogen production apparatus 550 is configured to generate hydrogen. The hydrogen production apparatus 550 may produce hydrogen by utilizing electric power. For example, the hydrogen production apparatus 550 is configured to produce hydrogen by utilizing electric power supplied from at least one of the power grid 12, the power generation apparatuses 520 and the power storage apparatus 530. Operations of the hydrogen production apparatus 550 may be controlled by the control device 560.

Details of the production process of hydrogen in the hydrogen production apparatus 550 are not particularly limited. The hydrogen production apparatus 550 is configured to produce hydrogen by an electrochemical method, for example. The hydrogen production apparatus 550 may produce hydrogen by a chemical method or by a biological method. As described above, hydrogen may be one example of an energy source.

In the present embodiment, the hydrogen storage apparatus 552 is configured to store hydrogen produced by the hydrogen production apparatus 550. For example, the hydrogen storage apparatus 552 is configured to store hydrogen produced by the hydrogen production apparatus 550 in a hydrogen storage container (not shown). A method of storing hydrogen is not particularly limited. Hydrogen may be stored under relatively high pressure or under relatively low pressure. Hydrogen may be stored in a gas state, in a liquid state, or in a state being absorbed in a hydrogen-occluding substance.

The hydrogen storage apparatus 264 may supply hydrogen to the outside. The hydrogen storage apparatus 264 may supply hydrogen to the fuel cell vehicle 22. Operations of the hydrogen production apparatus 550 may be controlled by the control device 560.

In the present embodiment, the control device 560 is configured to control operations of the power generation apparatuses 520, the power storage apparatus 530, the power distribution apparatus 540, the hydrogen production apparatus 550, and the hydrogen storage apparatus 552. The control device 560 is configured to adjust supply/demand of energy and an energy source in a community to which the energy management facility 124 belongs. The control device 560 may control operations of at least one of the power generation apparatuses 520, the power storage apparatus 530, the power distribution apparatus 540, the hydrogen production apparatus 550 and the hydrogen storage apparatus 552, based on an instruction from the management server 130. The control device 560 may have a similar configuration to the controller 240 to the extent that any technical contradiction does not arise.

Figure 6:
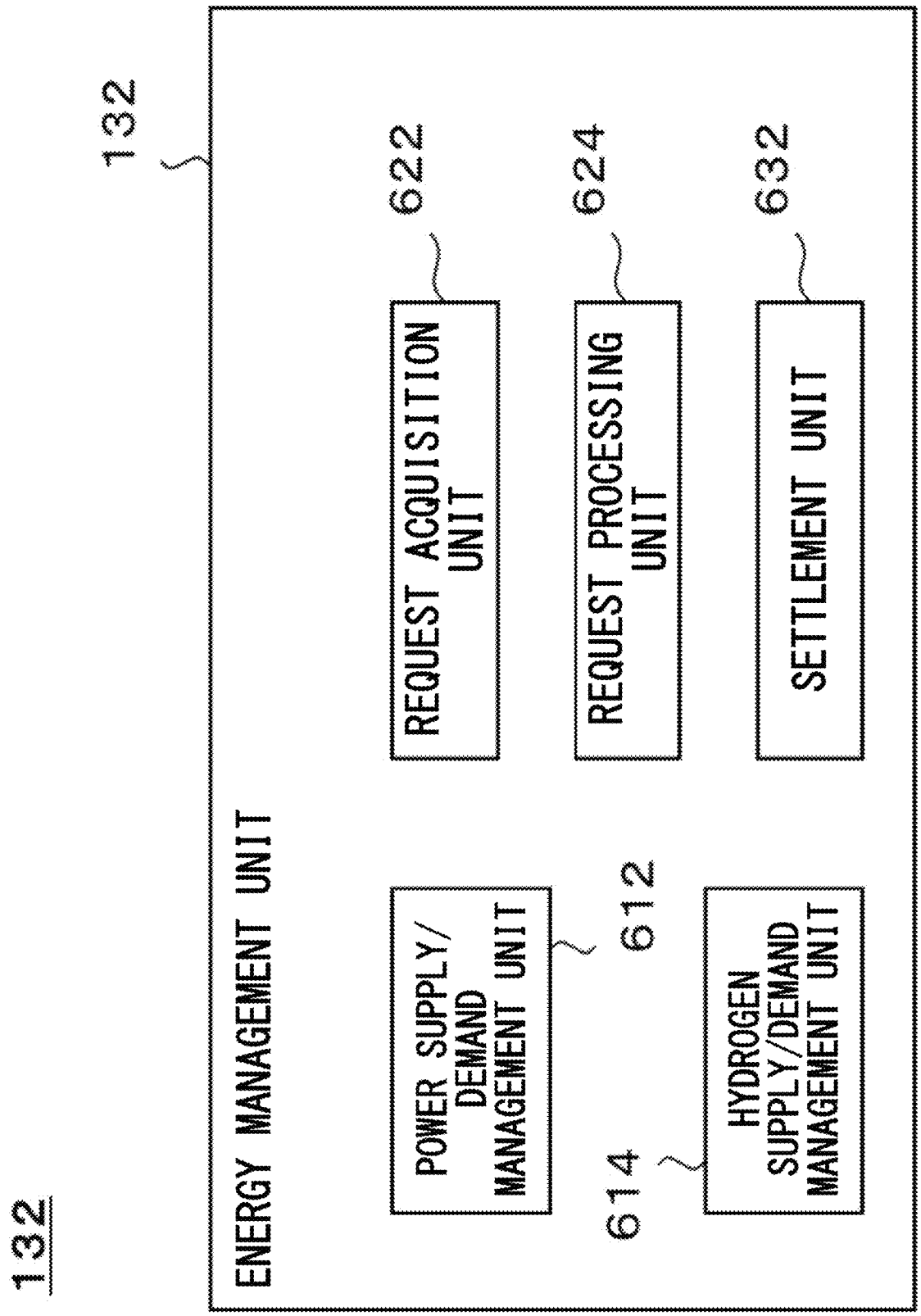
FIG. 6 schematically shows one example of an internal configuration of an energy management unit 132.

FIG. 6 schematically shows one example of an internal configuration of the energy management unit 132. In the present embodiment, the energy management unit 132 includes, for example, a power supply/demand management unit 612, a hydrogen supply/demand management unit 614, a request acquisition unit 622, a request processing unit 624, and a settlement unit 632.

The power supply/demand management unit 612 may be one example of a first supply/demand information acquisition unit, a second supply/demand information acquisition unit, and a power transmission and reception amount management unit. The hydrogen supply/demand management unit 614 may be one example of a first supply/demand information acquisition unit and a second supply/demand information acquisition unit. The request acquisition unit 622 may be one example of a first request acquisition unit. The request processing unit 624 may be one example of an energy management device. The settlement unit 632 may be one example of a power transmission and reception amount adjustment unit.

In the present embodiment, the power supply/demand management unit 612 is configured to manage power supply/demand in a community to be managed by the management server 130. For example, the power supply/demand management unit 612 is configured to manage power supply/demand of a community including one or more agricultural facilities 122, one or more energy management facilities 124, and one or more supplier/demander facilities 126.

The power supply/demand management unit 612 may acquire, from the controller 240 of the agricultural facility 122, information indicating power supply/demand in the agricultural facility 122. More specifically, the power supply/demand management unit 612 may acquire, from the controller 240 of the agricultural facility 122, information indicating power supply/demand in the tri-generation system 250 of the agricultural facility 122. Similarly, the power supply/demand management unit 612 may acquire information indicating power supply/demand in the supplier/demander facility 126.

The power supply/demand management unit 612 may acquire, from the control device 560 of the energy management facility 124, information indicating power supply/demand in the energy management facility 124. More specifically, the power supply/demand management unit 612 may acquire, from the control device 560 of the energy management facility 124, information indicating power supply/demand in the hydrogen production apparatus 550 of the energy management facility 124.

The power supply/demand management unit 612 may manage information indicating at least one of a power transmission amount and a power reception amount between the agricultural facility 122 and the power grid 12. For example, the power supply/demand management unit 612 may manage, from the controller 240 of the agricultural facility 122, information indicating at least one of a power transmission amount and a power reception amount between the tri-generation system 250 of the agricultural facility 122 and the power grid 12. Similarly, the power supply/demand management unit 612 may manage information indicating at least one of the power transmission amount and the power reception amount between the supplier/demander facility 126 and the power grid 12.

The power supply/demand management unit 612 may manage information indicating at least one of a power transmission amount and a power reception amount between the energy management facility 124 and the power grid 12. For example, the power supply/demand management unit 612 may manage, from the control device 560 of the energy management facility 124, information indicating at least one of a power transmission amount and a power reception amount between the hydrogen production apparatus 550 of the energy management facility 124 and the power grid 12.

In the present embodiment, the hydrogen supply/demand management unit 614 may acquire, from the controller 240 of the agricultural facility 122, information indicating hydrogen supply/demand in the agricultural facility 122. More specifically, the hydrogen supply/demand management unit 614 may acquire, from the controller 240 of the agricultural facility 122, information indicating hydrogen supply/demand in the tri-generation system 250 of the agricultural facility 122.

The hydrogen supply/demand management unit 614 may acquire information indicating hydrogen supply/demand in the energy management facility 124 from the control device 560 of the energy management facility 124. More specifically, the hydrogen supply/demand management unit 614 may acquire, from the control device 560 of the energy management facility 124, information indicating hydrogen supply/demand in the hydrogen production apparatus 550 of the energy management facility 124.

In the present embodiment, the request acquisition unit 622 is configured to acquire a variety of requests. The request acquisition unit 622 may acquire a request from at least one of the agricultural facility 122, the energy management facility 124, the supplier/demander facility 126, the fuel cell vehicle 22, the electric vehicle 24, and the communication terminal 32. For example, the request acquisition unit 622 is configured to acquire, from the controller 240 of the agricultural facility 122, a permission request for requesting permission for power transmission to the power grid 12 from the tri-generation system 250. The permission request may be one example of a first request.

In the present embodiment, the request processing unit 624 may generate a variety of requests for adjusting power supply/demand in a community. For example, the request processing unit 624 is configured acquire, from the power supply/demand management unit 612, information indicating power supply/demand in the tri-generation system 250 of the agricultural facility 122 and information indicating power supply/demand in the hydrogen production apparatus 550 of the energy management facility 124. Moreover, the request processing unit 624 is configured to acquire, from the hydrogen supply/demand management unit 614, information indicating hydrogen supply/demand in the tri-generation system 250 of the agricultural facility 122 and information indicating hydrogen supply/demand in the hydrogen production apparatus 550 of the energy management facility 124.

The request processing unit 624 may determine, based on the information indicating the power supply/demand and hydrogen supply/demand, at least one of (i) an upper limit value of a power amount that the hydrogen production apparatus 550 of the energy management facility 124 can receive from the power grid during a certain period, (ii) a target value of an amount of hydrogen that the hydrogen production apparatus 550 of the energy management facility 124 generates during the certain period, (iii) an upper limit value of a power amount that the tri-generation system 250 of the agricultural facility 122 can transmit to the power system during the certain period, and (iv) a target value of a power amount that the tri-generation system 250 of the agricultural facility 122 generates during the certain period. The request processing unit 624 may send information indicating the determined upper limit value or target value to at least one of the agricultural facility 122 and the energy management facility 124.

The request processing unit 624 may process a variety of requests acquired by the request acquisition unit 622. For example, when the request acquisition unit 622 acquired a permission request, the request processing unit 624 is configured to acquire, from the power supply/demand management unit 612, information indicating power supply/demand in the tri-generation system 250 of the agricultural facility 122 and information indicating power supply/demand in the hydrogen production apparatus 550 of the energy management facility 124. Moreover, the request processing unit 624 is configured to acquire, from the hydrogen supply/demand management unit 614, information indicating hydrogen supply/demand in the tri-generation system 250 of the agricultural facility 122 and information indicating hydrogen supply/demand in the hydrogen production apparatus 550 of the energy management facility 124.

Next, the request processing unit 624 is configured to determine to permit or prohibit power transmission to the power grid 12 from the tri-generation system 250, based on the information indicating power supply/demand in the tri-generation system 250 of the agricultural facility 122 and the information indicating power supply/demand in the hydrogen production apparatus 550 of the energy management facility 124.

For example, the request processing unit 624 is configured to determine to prohibit the power transmission when an excessiveness of the hydrogen supply in the hydrogen production apparatus 550 of the energy management facility 124 satisfies a predetermined first condition. The first condition may be a condition that an excessiveness of hydrogen exceeds a predetermined degree.

In the present embodiment, the settlement unit 632 is configured to generate a report indicating a power supply/demand situation per unit time period for each of one or more agricultural facilities 122, one or more energy management facilities 124, and one or more supplier/demander facilities 126. Examples of the length of the unit time period include a day, a week, a month, or the like.

When the request processing unit 624 determined to permit power transmission in response to the permission request from the agricultural facility 122, the settlement unit 632 may execute a processing for interpreting a power amount supplied to the power grid 12 from the agricultural facility 122 that sent the permission request as a power amount that the energy management facility 124 utilized for producing hydrogen. In one embodiment, the request processing unit 624 is configured to subtract a power transmission amount to the power grid 12 from the tri-generation system 250 of the agricultural facility 122 pertaining to the permission, from a power reception amount of the hydrogen production apparatus 550 of the energy management facility 124 from the power grid 12. In another embodiment, the request processing unit 624 is configured to add a power transmission amount to the power grid 12 from the tri-generation system 250 of the agricultural facility 122 pertaining to the permission, to a power transmission amount to the power grid 12 from the hydrogen production apparatus 550 of the energy management facility 124.

FIG. 7 schematically shows one example of an information processing in the settlement unit 632. In FIG. 7, the settlement unit 632 is configured to deduct a power amount that the agricultural facility 122 sold to the power grid 12, from a power amount that the energy management facility 124 purchased from the power grid 12. Thus, the power amount supplied to the power grid 12 from the agricultural facility 122 can be interpreted as the power amount that the energy management facility 124 utilized for producing hydrogen.

Figure 8:
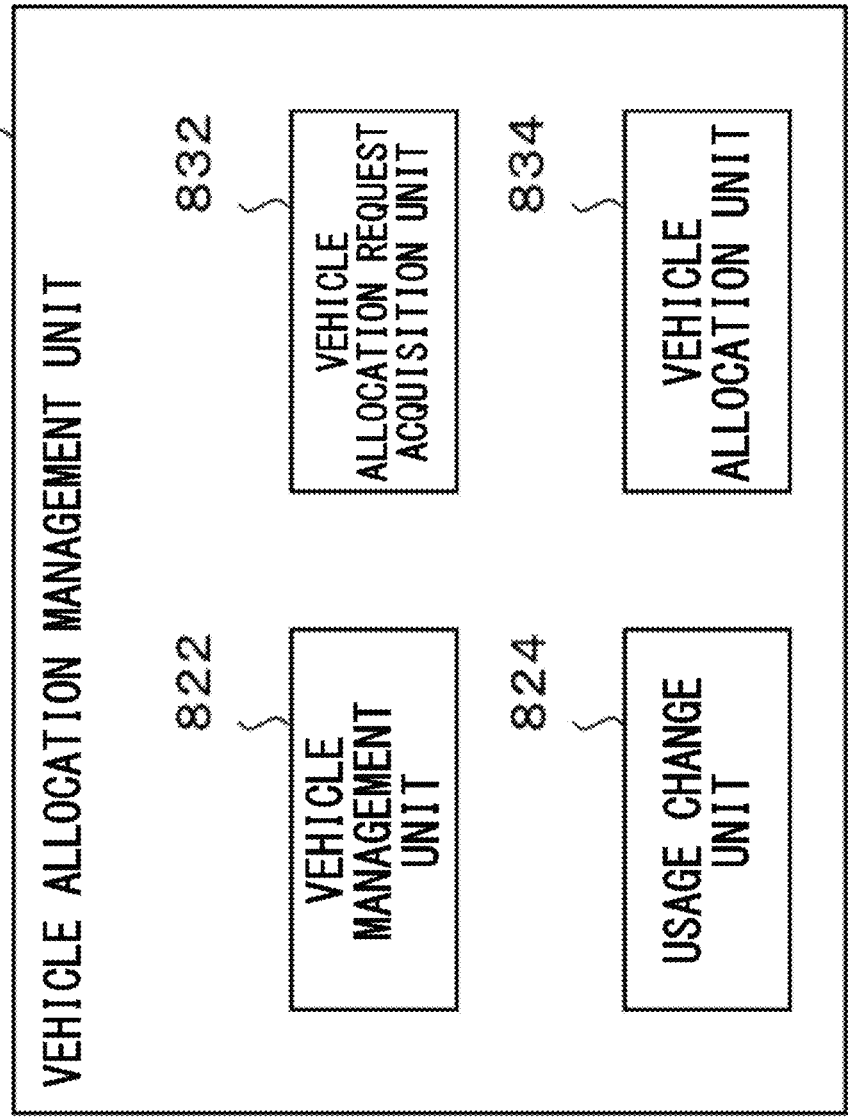
FIG. 8 schematically shows one example of an internal configuration of a vehicle allocation management unit 134.

FIG. 8 schematically shows one example of an internal configuration of the vehicle allocation management unit 134. In the present embodiment, the vehicle allocation management unit 134 includes, for example, a vehicle management unit 822, a usage change unit 824, a vehicle allocation request acquisition unit 832, and a vehicle allocation unit 834.

The vehicle management unit 822 may be one example of a movable object management unit. The vehicle allocation request acquisition unit 832 may be one example of a second request acquisition unit. The vehicle allocation unit 834 may be one example of a second determination unit.

In the present embodiment, the vehicle management unit 822 is configured to manage at least one of a fuel cell vehicle 22 and an electric vehicle 24. Specifically, the vehicle management unit 822 is configured to manage information indicating a state of at least one of one or more fuel cell vehicles 22 and one or more electric vehicles 24. Information indicating a state of the fuel cell vehicle 22 may include information indicating a remaining amount of hydrogen in the fuel cell vehicle 22. Information indicating a state of the electric vehicle 24 may include information indicating a remaining battery level of the electric vehicle 24.

Other examples of the state of the fuel cell vehicle 22 or the electric vehicle 24 include a location of the vehicle, the usage of the vehicle, a type of the vehicle, a use status of the vehicle, or the like. Examples of the usage of the vehicle include usage for lending to a user of a car rental service, usage for using as a power supply device, usage for using as a hydrogen carrying device, or the like. Examples of the type of the vehicle include a fuel cell vehicle, an electric vehicle, an engine vehicle configured to carry a portable hydrogen storage container, an engine vehicle configured to carry a portable power storage device, or the like.

Examples of the use status of the vehicle include a status of the vehicle, a scheduled time at which the status of the vehicle becomes available for the next time, a location of the vehicle at the scheduled time, or the like. Examples of the status include a state of being available, in use, under maintenance, or the like.

The usage change unit 824 is configured to change usage of at least one of one or more fuel cell vehicles 22 and one or more electric vehicles 24. The usage change unit 824 may change usage of the vehicle based on at least one of a power supply/demand situation and a hydrogen supply/demand situation in a community. For example, the usage change unit 824 is configured to determine the number of vehicles allocated for each usage, based on at least one of a power supply/demand situation and a hydrogen supply/demand situation in the community. The usage change unit 824 may change usage of each vehicle based on the determined result.

For example, in the tourist season, the usage change unit 824 is configured to increase the number of vehicles allocated for usage for lending to a user of a car rental service, compared to other seasons. On the other hand, in the harvest season of the farmwork, the usage change unit 824 is configured to increase the number of vehicles allocated for usage for using as a hydrogen carrying device, compared to other seasons.

In the present embodiment, the vehicle allocation request acquisition unit 832 is configured to acquire a vehicle allocation request from each facility of the energy management system 100. For example, the vehicle allocation request acquisition unit 832 is configured to acquire a vehicle allocation request from the agricultural facility 122. The vehicle allocation request may be one example of a second request.

In the present embodiment, the vehicle allocation unit 834 is configured to manage the use of vehicles that are managed by the vehicle allocation management unit 134. For example, when the vehicle allocation request acquisition unit 832 acquired a vehicle allocation request from the agricultural facility 122, the vehicle allocation unit 834 is configured to determine a vehicle to be moved to the agricultural facility 122 among one or more vehicles that are managed by the vehicle allocation management unit 134. The vehicle allocation unit 834 is configured to determine a vehicle to be moved to the agricultural facility 122, based on (i) a situation of power supply/demand and hydrogen supply/demand in the agricultural facility 122 or the tri-generation system 250 of the agricultural facility 122 and (ii) a state of each of one or more vehicles that are managed by the vehicle allocation management unit 134.

In one embodiment, when the excessiveness of hydrogen supply in the tri-generation system 250 of the agricultural facility 122 satisfies a second condition, the vehicle allocation unit 834 is configured to determine a vehicle whose remaining amount of hydrogen satisfies a third condition as a vehicle to be moved to the agricultural facility 122. The second condition may be a condition that the excessiveness of hydrogen supply exceeds a predetermined degree. The third condition may be a condition that a remaining amount of hydrogen is less than a predetermined value. The third condition may be a condition that a remaining amount of hydrogen is a sufficient level to reach the agricultural facility 122 and less than a predetermined value.

Thus, a vehicle that can sufficiently receive hydrogen stored in the hydrogen storage apparatus 264 of the agricultural facility 122 is dispatched to the agricultural facility 122. As a result, the excessiveness of hydrogen in the agricultural facility 122 is relieved.

In another embodiment, when the excessiveness of hydrogen supply in the tri-generation system 250 of the agricultural facility 122 satisfies a second condition, the vehicle allocation unit 834 is configured to determine a vehicle whose remaining battery level satisfies a fourth condition as a vehicle to be moved to the agricultural facility 122. The second condition may be a condition that the excessiveness of hydrogen supply exceeds a predetermined degree. The fourth condition may be a condition that the remaining battery level is less than a predetermined value. The fourth condition may be a condition that the remaining battery level is a sufficient level to reach the agricultural facility 122 and less than a predetermined value.

Thus, a vehicle that can sufficiently receive electric power generated by the fuel cell 262 of the agricultural facility 122 is dispatched to the agricultural facility 122. As a result, the excessiveness of hydrogen in the agricultural facility 122 is relieved.

FIG. 9 schematically shows one example of a data table 900. The data table 900 may be one example of a data structure of a database managed by the vehicle management unit 822.

In the present embodiment, the data table 900 is configured to store, in association with each other, (i) an identification information 912 of a vehicle and (ii) at least one of information 914 indicating a current location of the vehicle, information 916 indicating usage of the vehicle, information 918 indicating a type of the vehicle, information 920 indicating a remaining amount of hydrogen, information 922 indicating a status of the vehicle, and information 924 indicating a scheduled time at which the status of the vehicle becomes available for the next time.

While the embodiments of the present invention have been described, the technical scope of the invention is not limited to the above described embodiments. It is apparent to persons skilled in the art that various alterations and improvements can be added to the above-described embodiments. Also, matters explained with reference to a particular embodiment can be applied to other embodiments as long as such application does not cause a technical contradiction. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in the order.

EXPLANATION OF REFERENCES

12: power grid, 14: communication network, 22: fuel cell vehicle, 24: electric vehicle, 32: communication terminal, 100: energy management system, 122: agricultural facility, 124: energy management facility, 126: supplier/demander facility, 130: management server, 132: energy management unit, 134: vehicle allocation management unit, 210: farm field, 212: temperature sensor, 214: carbon dioxide sensor, 220: power load, 230: power distribution apparatus, 240: controller, 250: tri-generation system, 260: reformer, 262: fuel cell, 263: pipe, 264: hydrogen storage apparatus, 265: pipe, 266: automatic valve, 272: flow control unit, 274: pipe, 282: heat accumulator, 284: heat exchanger, 286: automatic valve, 322: air-conditioning management unit, 324: power supply/demand management unit, 326: hydrogen supply/demand management unit, 330: system control unit, 332: power supply control unit, 334: hydrogen supply control unit, 336: carbon dioxide supply control unit, 338: heat supply control unit, 342: vehicle allocation request unit, 410: pipe, 412: automatic valve, 414: flow regulation valve, 420: pipe, 422: relief valve, 520: power generation apparatus, 522: fuel cell, 524: photovoltaic apparatus, 530: power storage apparatus, 540: power distribution apparatus, 550: hydrogen production apparatus, 552: hydrogen storage apparatus, 560: control device, 612: power supply/demand management unit, 614: hydrogen supply/demand management unit, 622: request acquisition unit, 624: request processing unit, 632: settlement unit, 822: vehicle management unit, 824: usage change unit, 832: vehicle allocation request acquisition unit, 834: vehicle allocation unit, 900: data table, 912: identification, 914: information, 916: information, 918: information, 920: information, 922: information, 924: information

What is claimed is:

1. An energy management device comprising:
a first supply/demand information acquisition unit configured to acquire first supply/demand information indicating power supply/demand and hydrogen supply/demand in a hydrogen generation system configured to generate hydrogen by utilizing electric power,
a second supply/demand information acquisition unit configured to acquire second supply/demand information indicating power supply/demand and hydrogen supply/demand in each of one or plurality of tri-generation systems, and
a supply/demand management unit configured to determine, based on the first supply/demand information and the second supply/demand information, at least one of (i) an upper limit value of a power amount that the hydrogen generation system can receive from a power grid during a certain period, (ii) a target value of an amount of hydrogen that the hydrogen generation system generates during the certain period, (iii) an upper limit value of a power amount that each of the one or plurality of tri-generation systems can transmit to the power grid during the certain period, and (iv) a target value of a power amount that each of the one or plurality of tri-generation systems generates during the certain period,
wherein each of the one or plurality of tri-generation systems includes:
a carbon dioxide generation unit configured to generate carbon dioxide,
a power generation unit configured to generate electric power by utilizing hydrogen, and
a heat generation unit configured to generate heat.

2. The energy management device according to claim 1, further comprising:
a first request acquisition unit configured to acquire a first request for requesting permission for power transmission from a first tri-generation system of the one or plurality of tri-generation systems to the power grid, and
a first determination unit configured to determine whether to permit or prohibit the power transmission based on the first supply/demand information when the first request acquisition unit received the first request.

3. The energy management device according to claim 2, wherein the first determination unit is configured to determine to prohibit the power transmission when an excessiveness of hydrogen supply in the hydrogen generation system indicated by the first supply/demand information satisfies a predetermined first condition.

4. The energy management device according to claim 3, further comprising:
a power transmission and reception amount management unit configured to manage information indicating at least one of a power transmission amount and a power reception amount between (i) each of the one or plurality of tri-generation systems and the hydrogen generation system and (ii) the power grid, and
a power transmission and reception amount adjustment unit configured to, when the first determination unit determined to permit the power transmission, (i) subtract a power transmission amount to the power grid from the first tri-generation system pertaining to the permission, from a power reception amount of the hydrogen generation system from the power grid or (ii) add a power transmission amount to the power grid from the first tri-generation system pertaining to the permission, to a power transmission amount from the hydrogen generation system to the power grid.

5. The energy management device according to claim 2, further comprising:
a power transmission and reception amount management unit configured to manage information indicating at least one of a power transmission amount and a power reception amount between (i) each of the one or plurality of tri-generation systems and the hydrogen generation system and (ii) the power grid, and
a power transmission and reception amount adjustment unit configured to, when the first determination unit determined to permit the power transmission, (i) subtract a power transmission amount to the power grid from the first tri-generation system pertaining to the permission, from a power reception amount of the hydrogen generation system from the power grid or (ii) add a power transmission amount to the power grid from the first tri-generation system pertaining to the permission, to a power transmission amount from the hydrogen generation system to the power grid.

6. The energy management device according to claim 2 further comprising:
a movable object management unit configured to manage information indicating a state of one or plurality of movable objects,
a second request acquisition unit configured to acquire a second request for requesting to move at least one of the one or plurality of movable objects to a second tri-generation system of the one or plurality of tri-generation systems, and
a second determination unit configured to determine, when the second request acquisition unit received the second request, a movable object to be moved to the second tri-generation system among the one or plurality of movable objects based on (i) the second supply/demand information and (ii) the information indicating a state of the one or plurality of movable objects,
wherein each of the one or plurality of movable objects can be equipped with at least one of a hydrogen storage container, a fuel cell and a storage battery,
wherein the information indicating a state of the one or plurality of movable objects includes information indicating a remaining amount of hydrogen or a remaining battery level of each movable object.

7. The energy management device according to claim 1 further comprising:
a movable object management unit configured to manage information indicating a state of one or plurality of movable objects,
a second request acquisition unit configured to acquire a second request for requesting to move at least one of the one or plurality of movable objects to a second tri-generation system of the one or plurality of tri-generation systems, and
a second determination unit configured to determine, when the second request acquisition unit received the second request, a movable object to be moved to the second tri-generation system among the one or plurality of movable objects based on (i) the second supply/demand information and (ii) the information indicating a state of the one or plurality of movable objects,
wherein each of the one or plurality of movable objects can be equipped with at least one of a hydrogen storage container, a fuel cell and a storage battery,
wherein the information indicating a state of the one or plurality of movable objects includes information indicating a remaining amount of hydrogen or a remaining battery level of each movable object.

8. The energy management device according to claim 7, wherein the second determination unit is configured to, when an excessiveness of hydrogen supply in the second tri-generation system indicated by the second supply/demand information satisfies a predetermined second condition, determine a movable object whose remaining amount of hydrogen satisfies a predetermined third condition or a movable object whose remaining battery level satisfies a predetermined fourth condition as a movable object to be moved to the second tri-generation system.

9. A hydrogen utilization system comprising:
the energy management device according to claim 1,
the hydrogen generation system, and
the one or plurality of tri-generation systems.

10. A non-transitory computer readable medium having recorded thereon a program for causing a computer to function as an energy management device, the energy management device comprising:
a first supply/demand information acquisition unit configured to acquire first supply/demand information indicating power supply/demand and hydrogen supply/demand in a hydrogen generation system configured to generate hydrogen by utilizing electric power,
a second supply/demand information acquisition unit configured to acquire second supply/demand information indicating power supply/demand and hydrogen supply/demand in each of one or plurality of tri-generation systems, and
a supply/demand management unit configured to determine, based on the first supply/demand information and the second supply/demand information, at least one of (i) an upper limit value of a power amount that the hydrogen generation system can receive from a power grid during a certain period, (ii) a target value of an amount of hydrogen that the hydrogen generation system generates during the certain period, (iii) an upper limit value of a power amount that each of the one or plurality of tri-generation systems can transmit to the power grid during the certain period, and (iv) a target value of a power amount that each of the one or plurality of tri-generation systems generates during the certain period,
wherein each of the one or plurality of tri-generation systems includes:
a carbon dioxide generation unit configured to generate carbon dioxide,
a power generation unit configured to generate electric power by utilizing hydrogen, and
a heat generation unit configured to generate heat.

11. An energy management method comprising:
acquiring, by a computer, first supply/demand information indicating power supply/demand and hydrogen supply/demand in a hydrogen generation system configured to generate hydrogen by utilizing electric power,
acquiring, by the computer, second supply/demand information indicating power supply/demand and hydrogen supply/demand in each of one or plurality of tri-generation systems, and managing supply/demand by the computer, by determining, based on the first supply/demand information and the second supply/demand information, at least one of (i) an upper limit value of a power amount that the hydrogen generation system can receive from a power grid during a certain period, (ii) a target value of amount of hydrogen that the hydrogen generation system generates during the certain period, (iii) an upper limit value of a power amount that each of the one or plurality of tri-generation systems can transmit to the power grid during the certain period, and (iv) a target value of a power amount that each of the one or plurality of tri-generation systems generates during the certain period, wherein each of the one or plurality of tri-generation systems includes:

a carbon dioxide generation unit configured to generate carbon dioxide, a power generation unit configured to generate electric power by utilizing hydrogen, and a heat generation unit configured to generate heat.

\* \* \* \* \*